Figure 3:
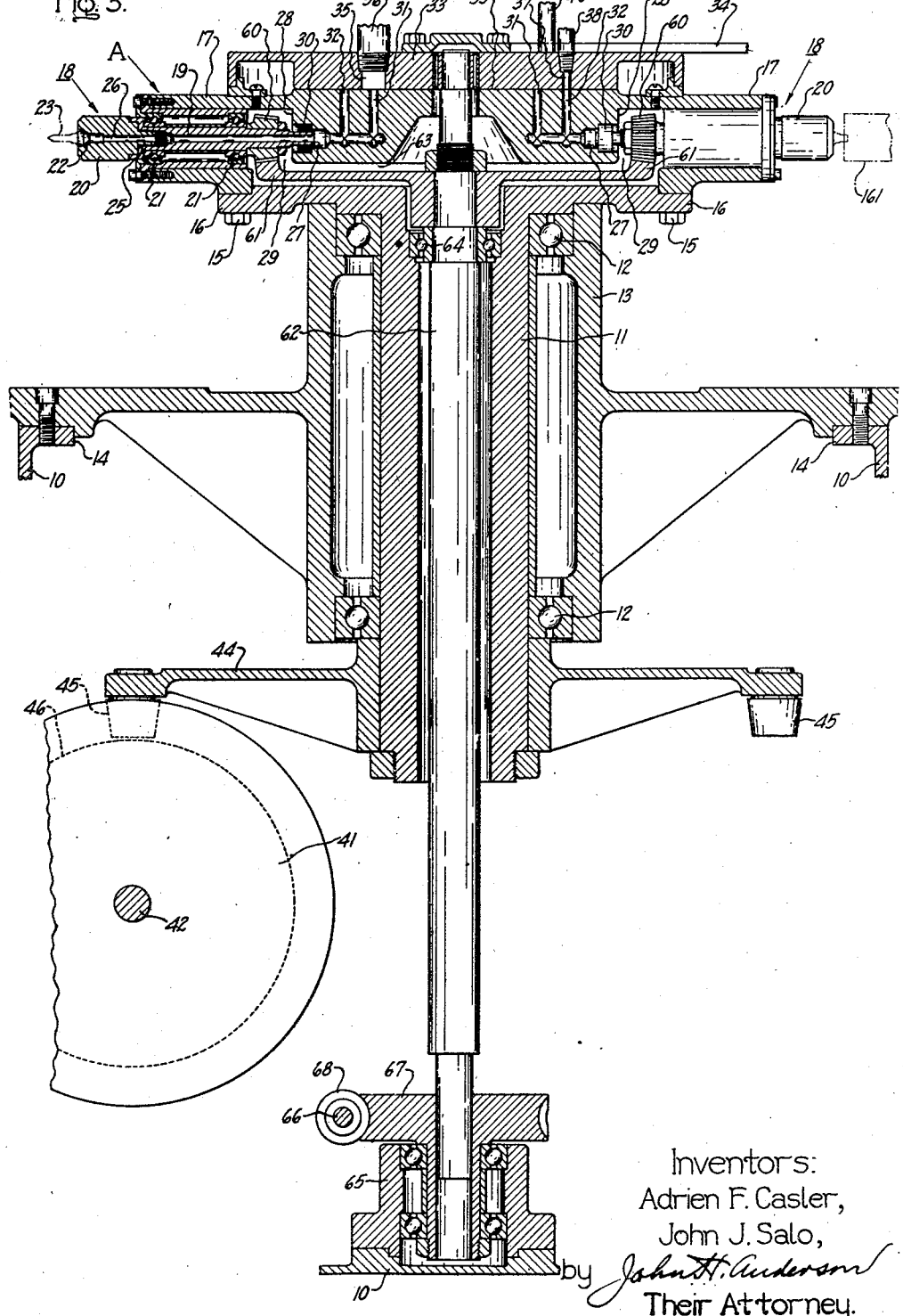

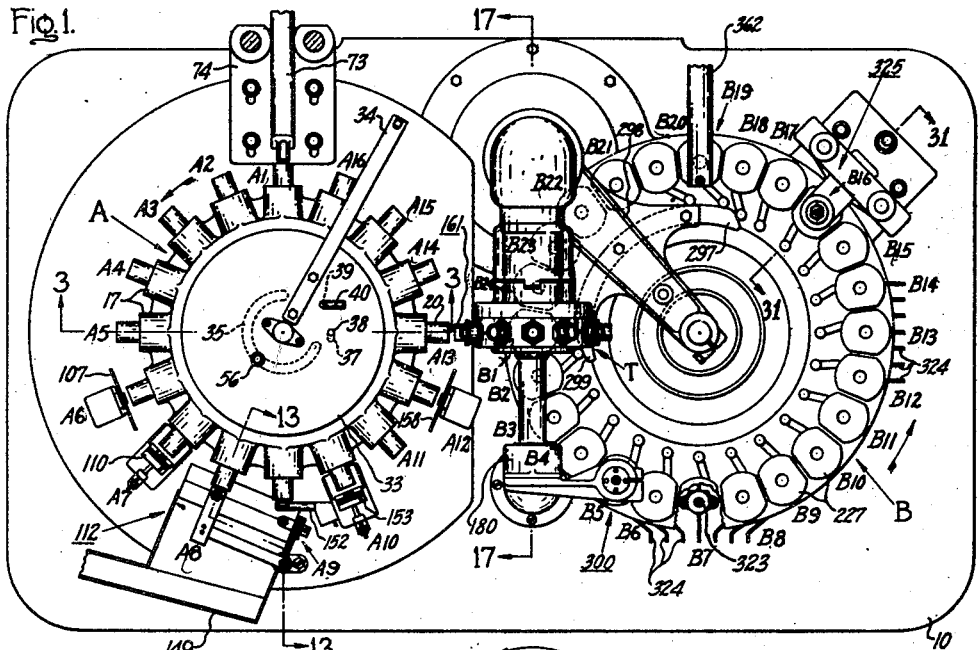
Fig. 1. Fig. 2.
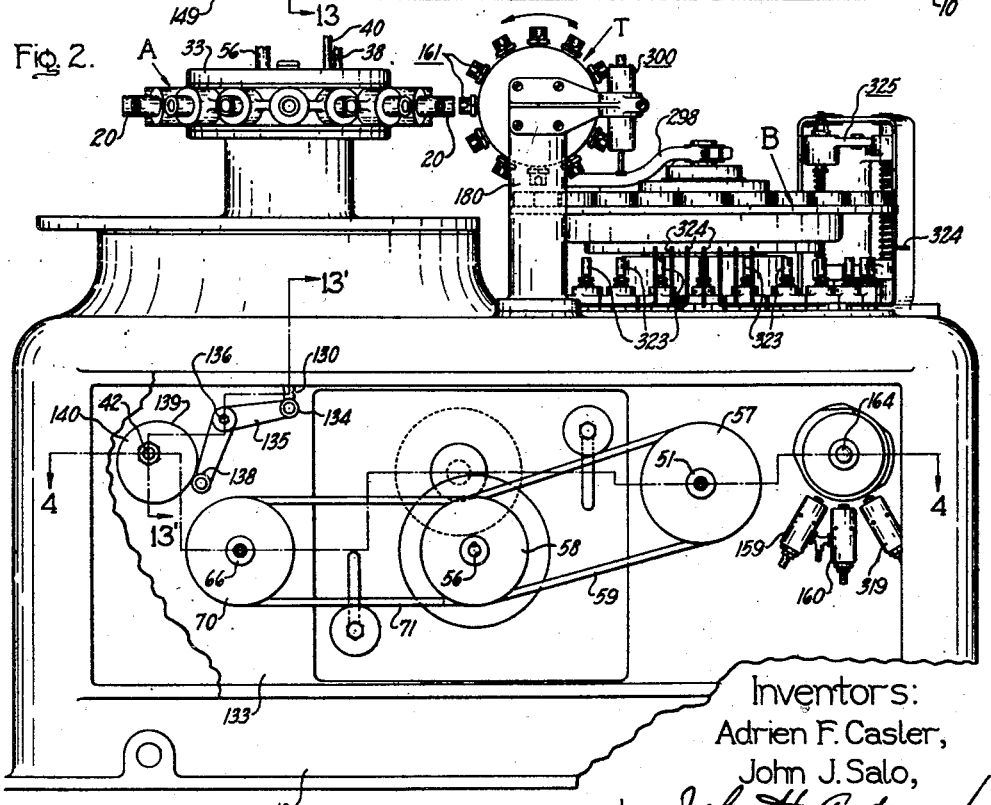
Inventors:
Adrien F. Casler,
John J. Salo,
by John H. Anderson
Their Attorney.

Inventors:
Adrien F. Casler,
John J. Salo,
by John H. Anderson
Their Attorney.

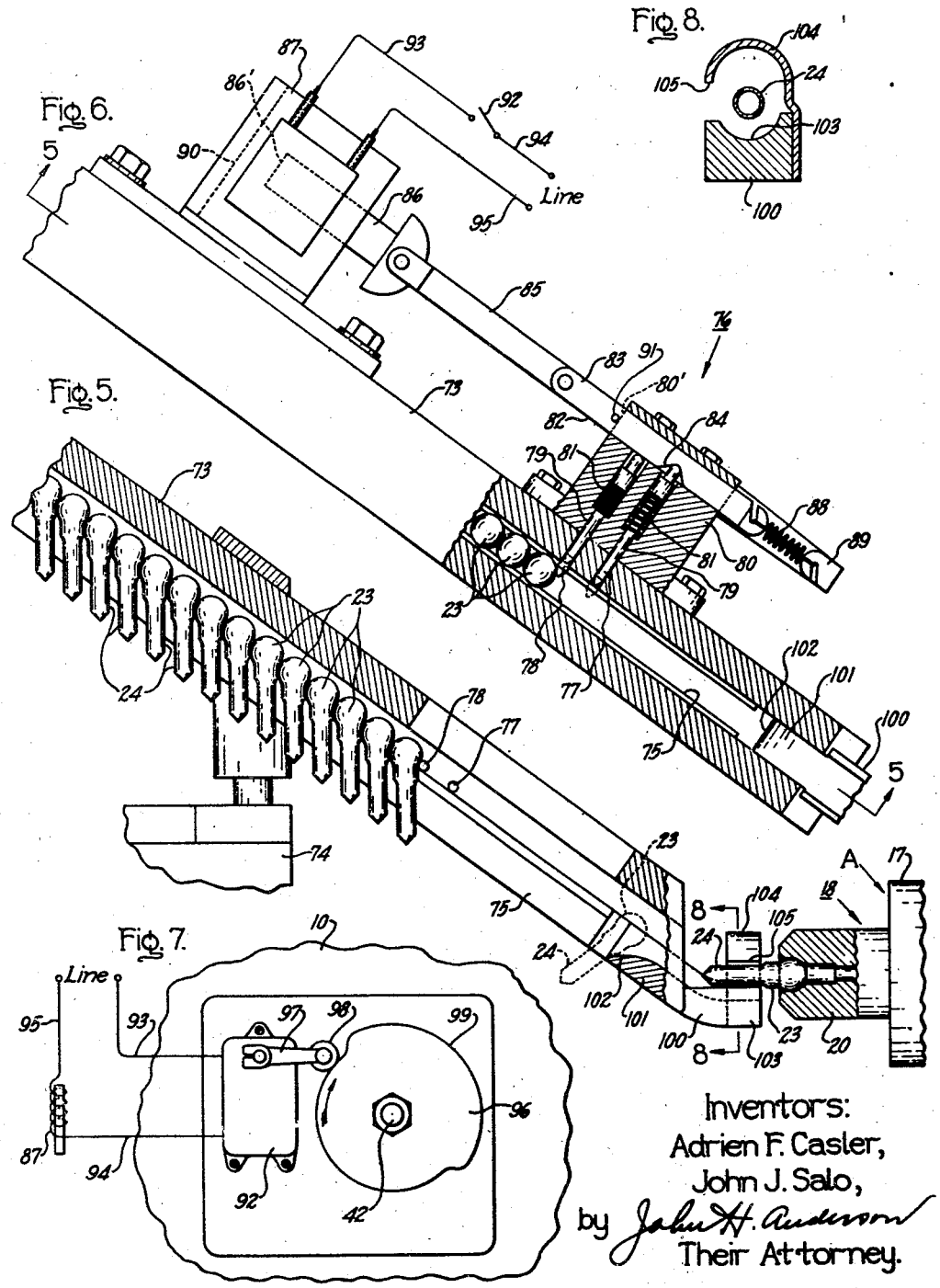

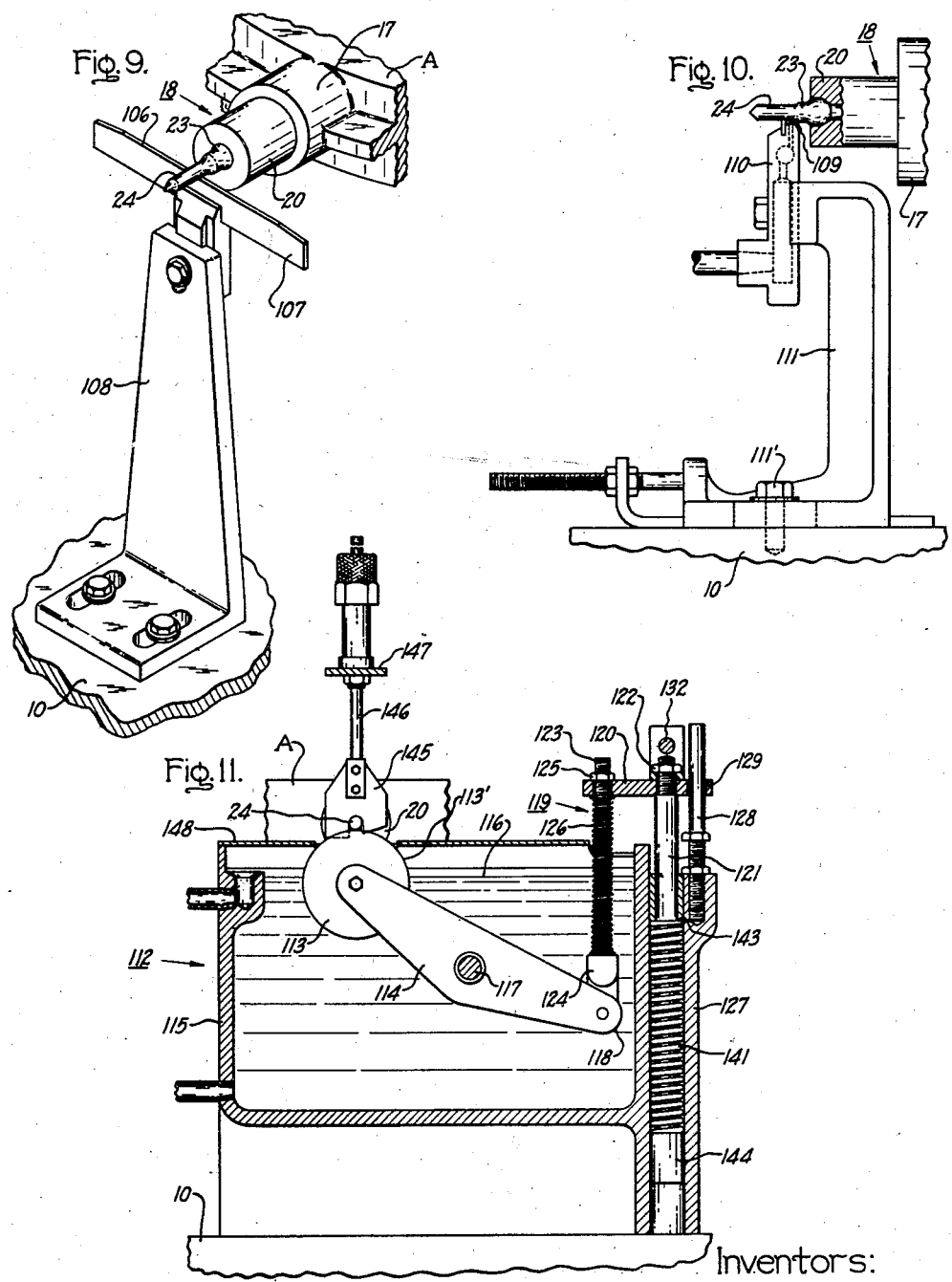

Sept. 23, 1947.  A. F. CASLER ET AL  2,427,712
METHOD AND APPARATUS FOR THE CONVEYANCE OF
ARTICLES IN GLASS WORKING APPARATUS
Filed Nov. 21, 1942   14 Sheets-Sheet 6

Fig. 12.

Fig. 13.

Inventors:
Adrien F. Casler,
John J. Salo,
by John H. Anderson
Their Attorney.

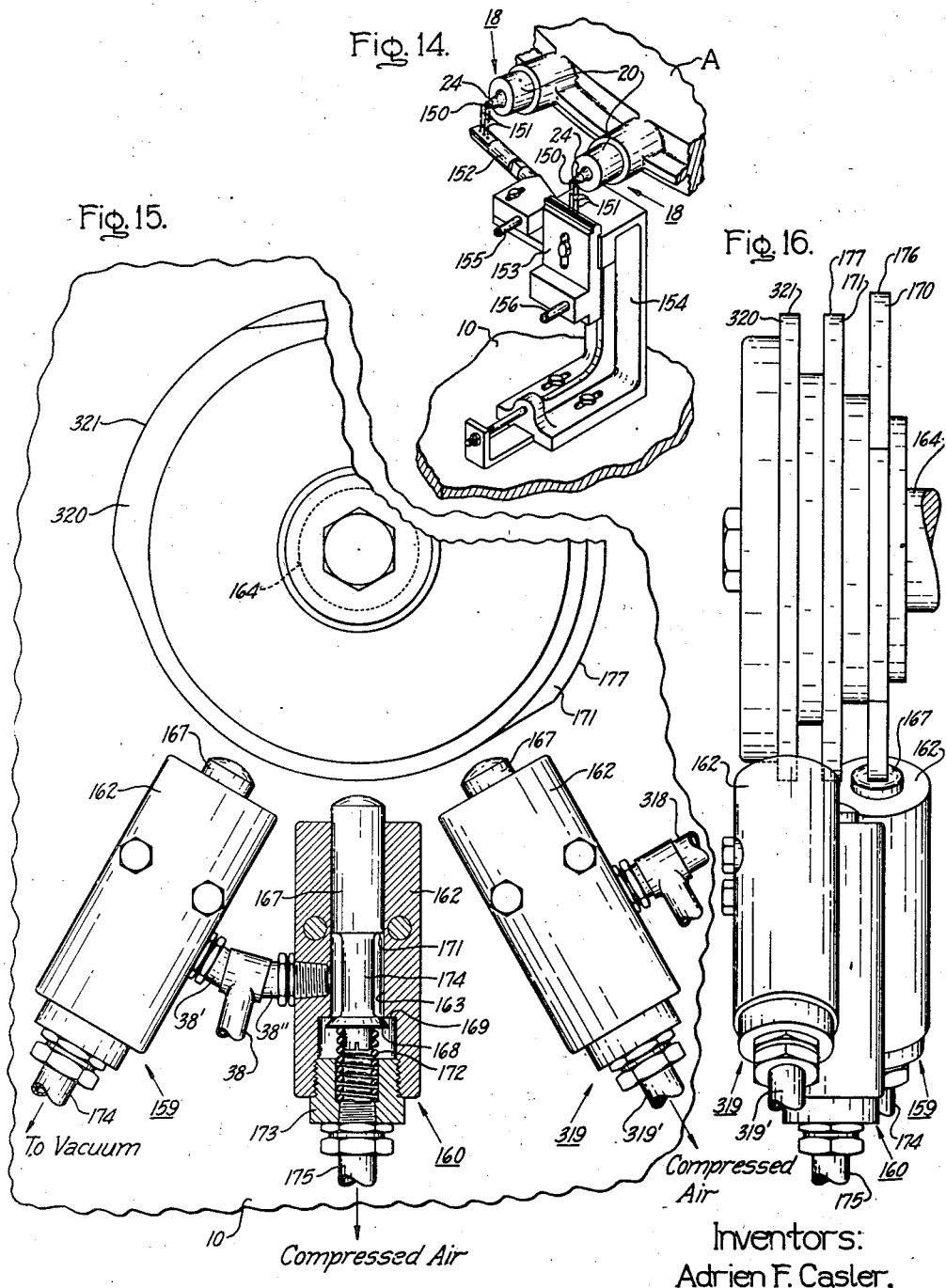

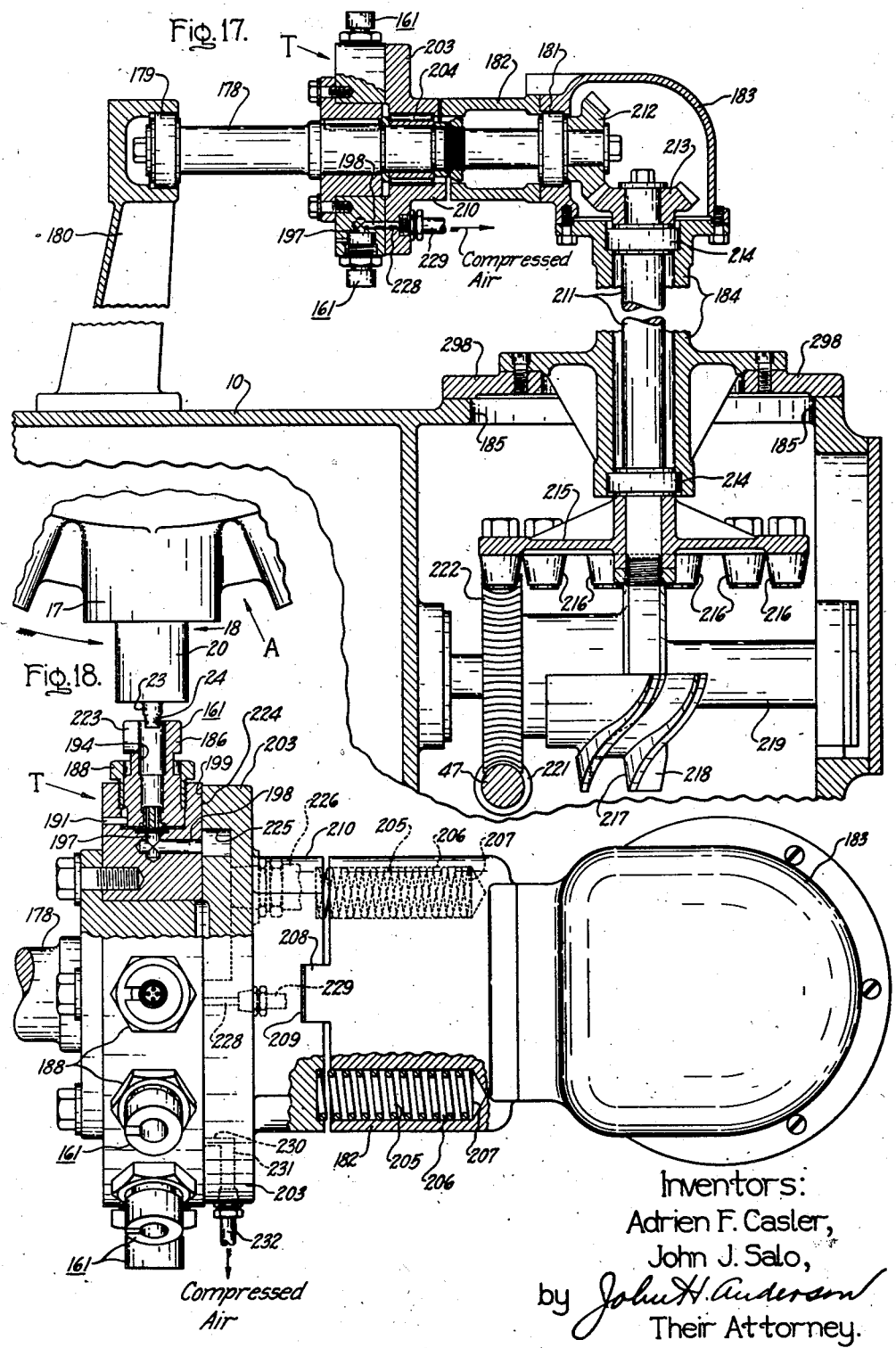

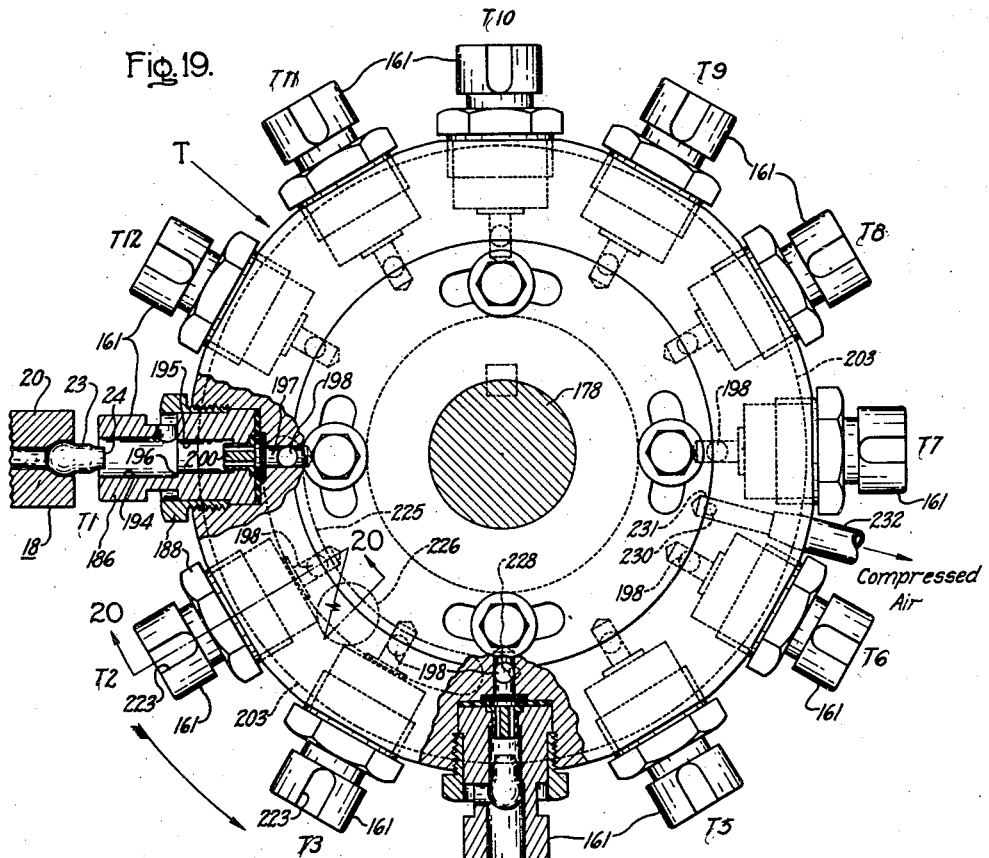
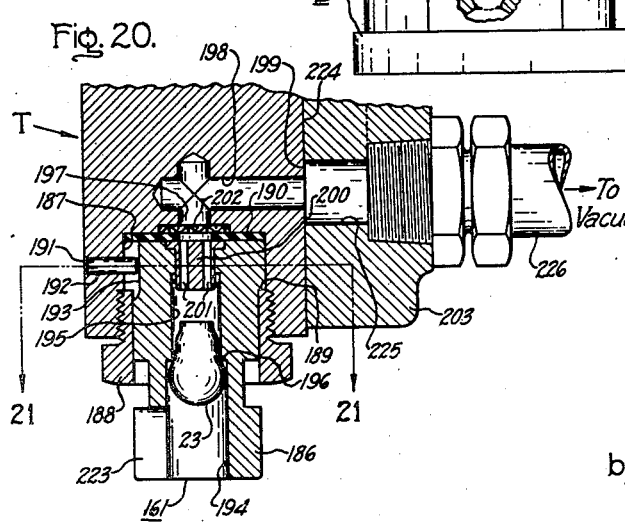
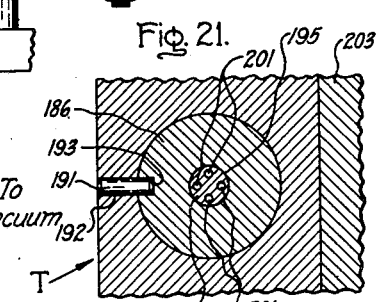
Inventors:
Adrien F. Casler,
John J. Salo,
by John H. Anderson
Their Attorney.

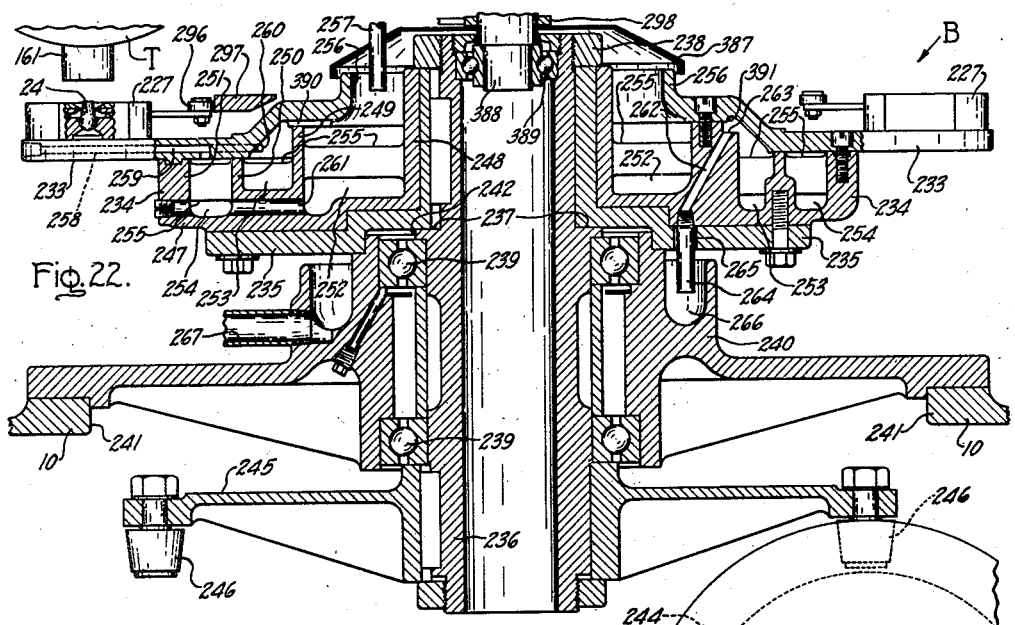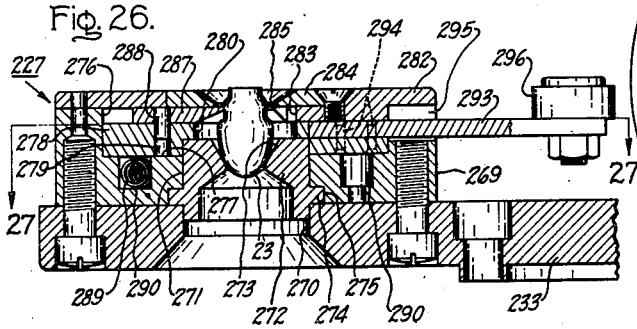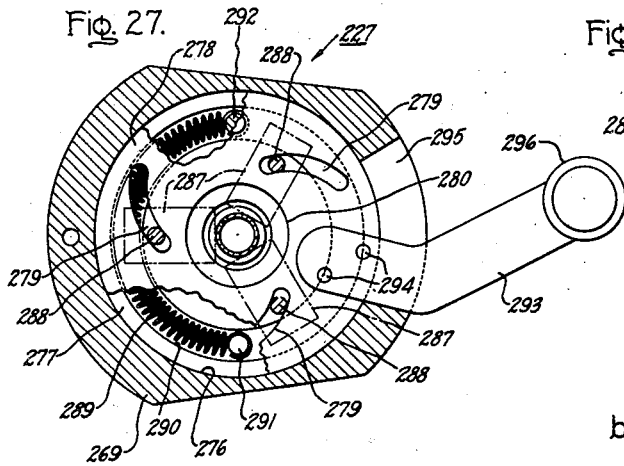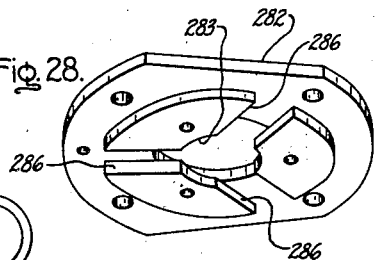

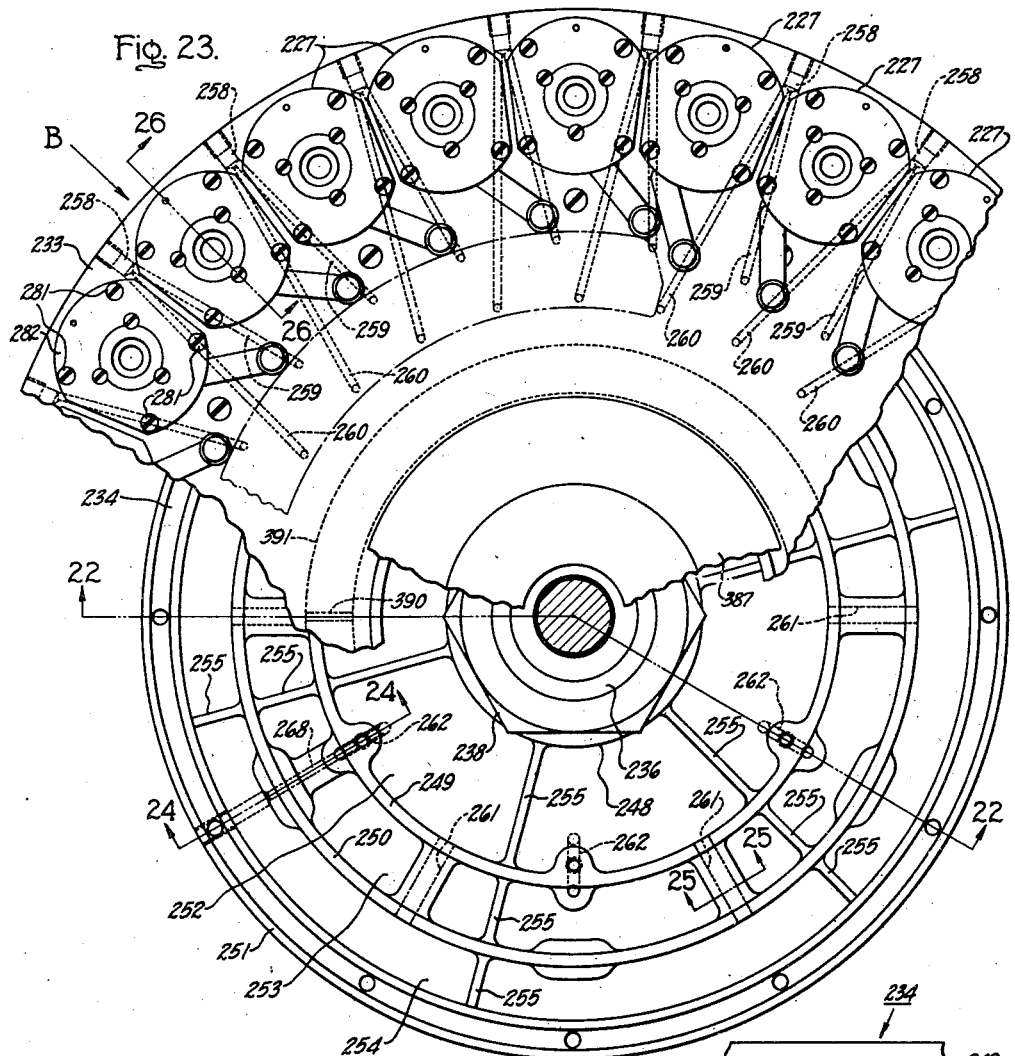

Sept. 23, 1947.  A. F. CASLER ET AL  2,427,712
METHOD AND APPARATUS FOR THE CONVEYANCE OF
ARTICLES IN GLASS WORKING APPARATUS
Filed Nov. 21, 1942  14 Sheets-Sheet 12

Inventors:
Adrien F. Casler,
John J. Salo,
by John H. Anderson
Their Attorney.

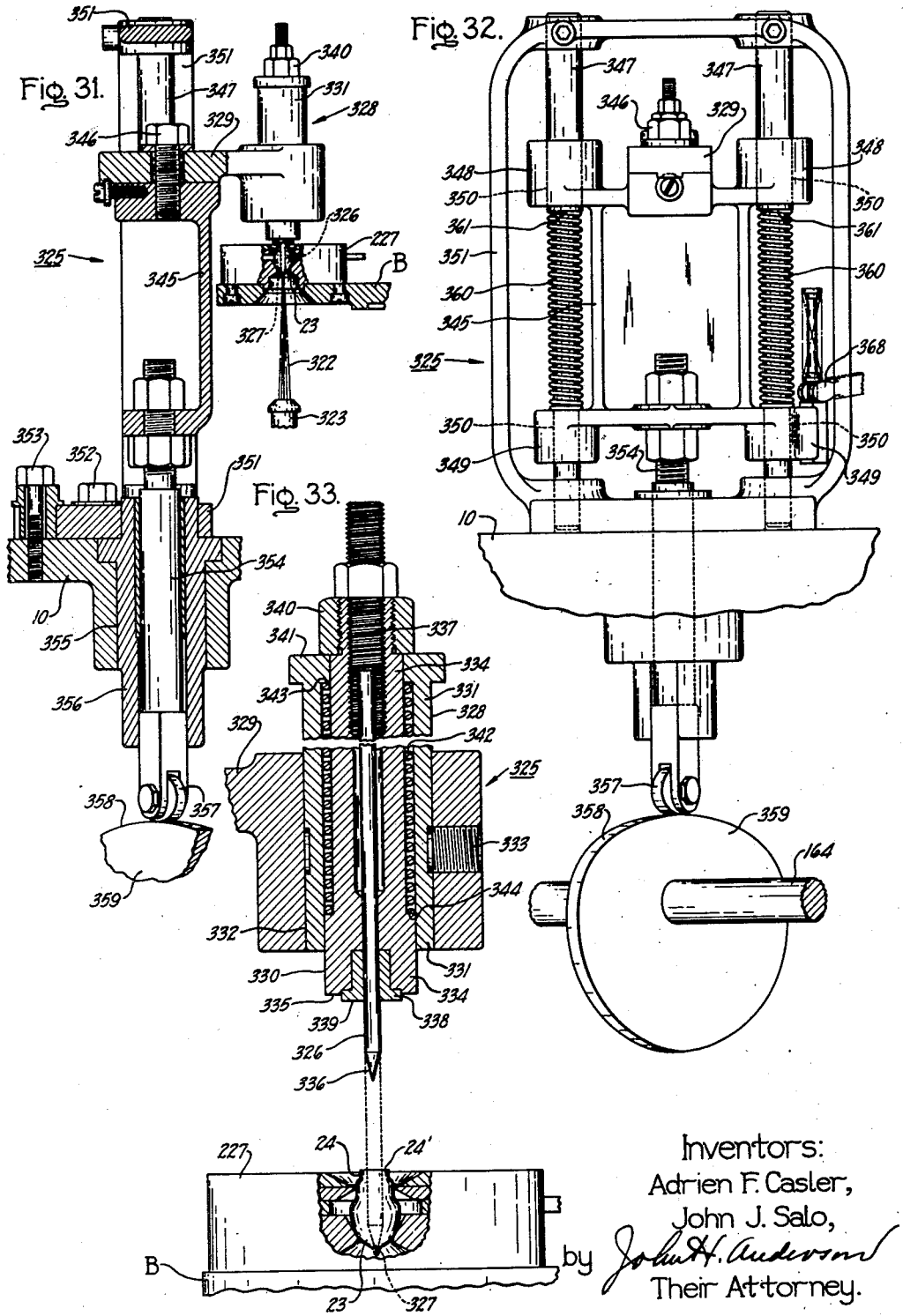

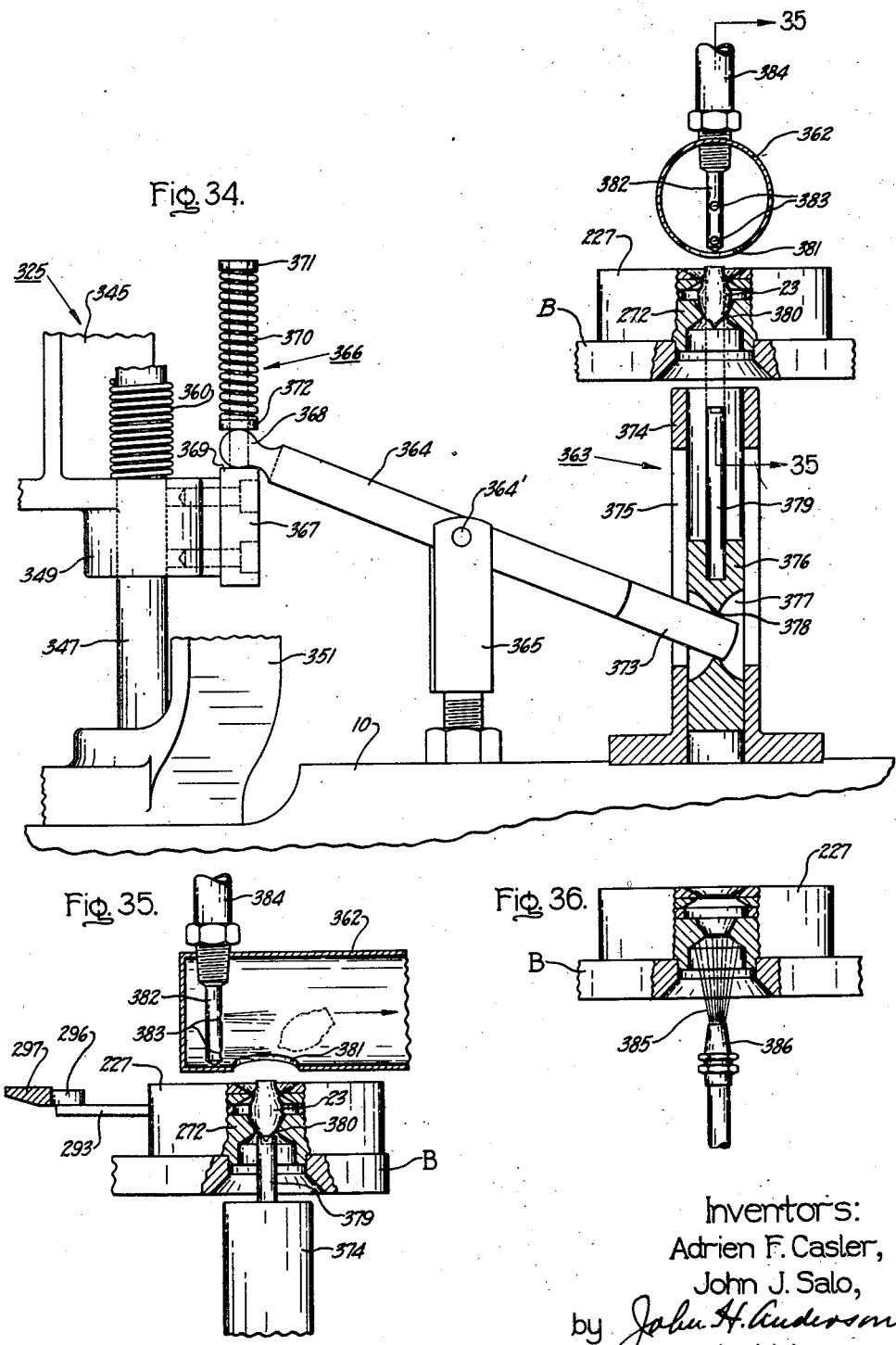

Patented Sept. 23, 1947

2,427,712

UNITED STATES PATENT OFFICE 2,427,712

METHOD AND APPARATUS FOR THE CONVEYANCE OF ARTICLES IN GLASSWORKING APPARATUS

Adrien F. Casler, Willoughby, and John J. Salo, Cleveland, Ohio, assignors to General Electric Company, a corporation of New York Application November 21, 1942, Serial No. 466,518

8 Claims. (Cl. 198—25)

1

Our invention relates in general to apparatus for severing and reshaping glass, and more particularly to apparatus for severing a portion of the neck of a lamp bulb and forming an indentation in the bulb wall.

Glass bulbs for miniature electric incandescent lamps, such as the flashlight lamp disclosed in Geiger et al. Patent No. 1,983,362, issued December 4, 1934, are usually blown from glass tubing by a process resulting in the formation of a closed neck on the bulb which must thereafter be cut off in order to provide an opening for the introduction of the lamp mount structure into the bulb. In addition, the bulbs for certain of the lamps disclosed in the said Geiger et al. patent are formed with a small point-shaped indentation in the inner surface of the bulb wall, at a point adjacent the tip of the bulb, for engagement by one of the leading-in wires of the lamp mount to thereby accurately locate and maintain the lamp filament in a definite position within the bulb.

One object of our invention is to provide apparatus for severing and reshaping glass articles.

Another object of our invention is to provide a fully automatic machine for severing a portion of the neck of a lamp bulb then denting the wall of the bulb.

Still another object of our invention is to provide a fully automatic machine for severing a portion of the neck of a glass bulb at a predetermined point and then forming an outward dent in the bulb wall at the tip of the bulb, the operation of the machine being fully automatic from the time the bulbs are first loaded into the bulb feeding mechanism of the machine until they are discharged from the machine.

A further object of our invention is to provide a novel transfer arrangement for effecting the transfer of an article from one carrier member of a machine to another carrier member of the said machine.

A still further object of our invention is to provide a machine having a novel article ejecting arrangement for ejecting the article from an article holder on the machine.

Further objects and advantages of our invention will appear from the following description of a species thereof and from the accompanying drawing, in which:

Fig. 1 is a partial plan view of a machine comprising our invention; Fig. 2 is a front elevation of the machine shown in Fig. 1 with a portion of the front cover plate broken away and with certain of the operating mechanisms adjacent the

Figure 4:
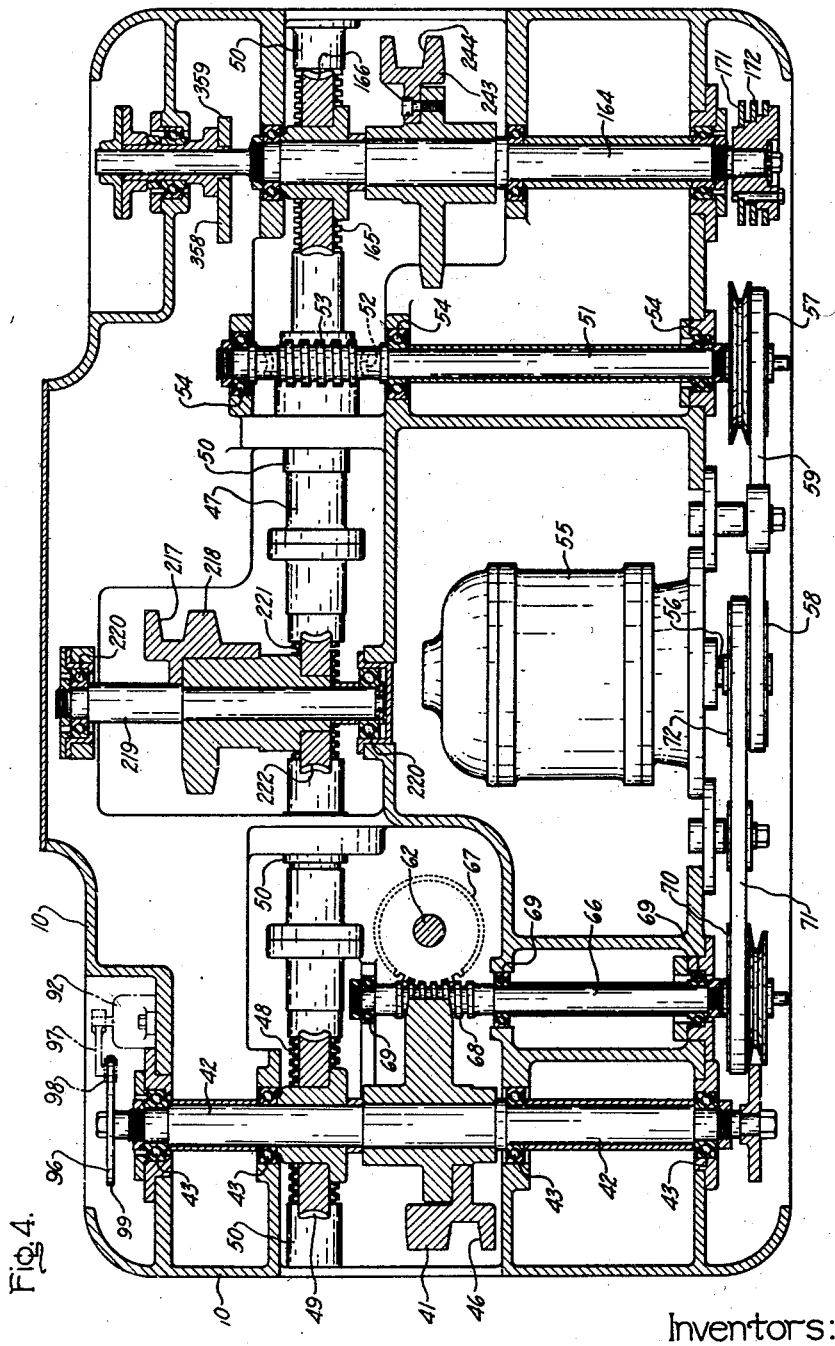
Figure 29:
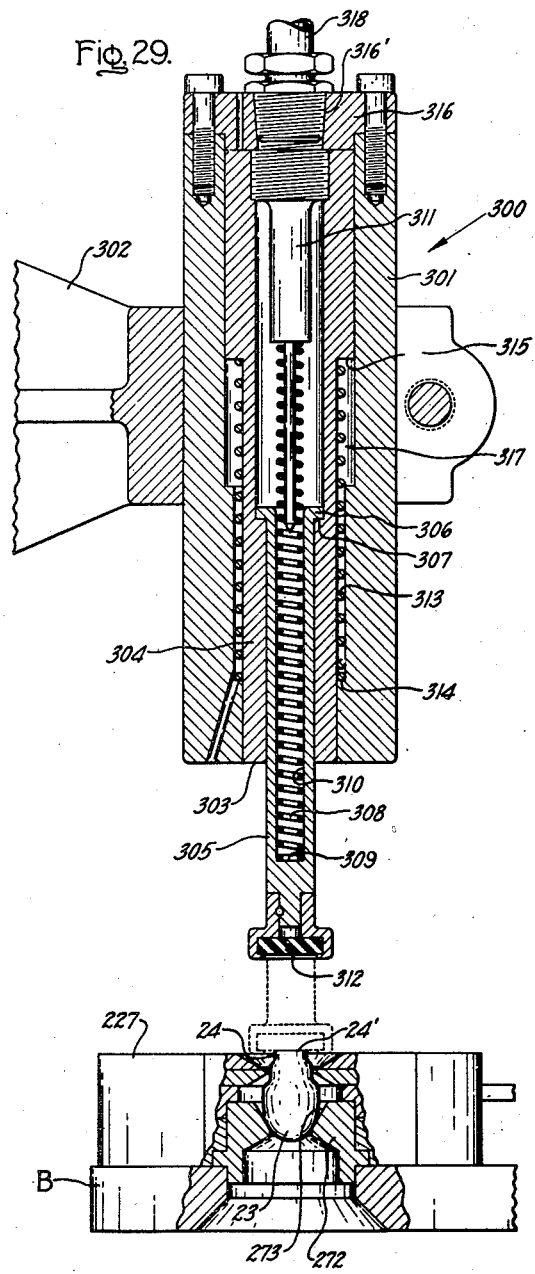
Figure 30:
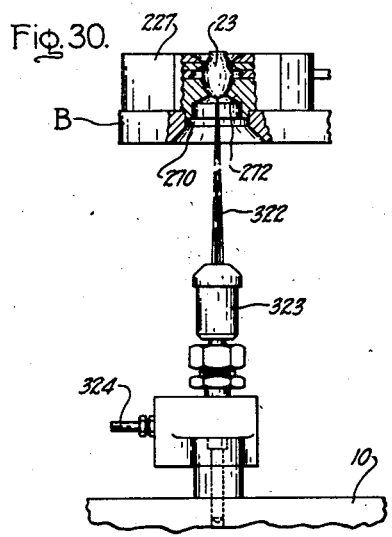

2 first or "A" turret omitted for purposes of clarity; Fig. 3 is a vertical section of the first or "A" turret of the machine comprising our invention, the section being taken on the line 3—3 of Fig. 1; Fig. 4 is a horizontal section taken on the line 4—4 of Fig. 2 and showing the driving and operating shaft arrangement of the machine in plan; Fig. 5 is a view partly in elevation and partly in section on line 5—5 of Fig. 6, and Fig. 6 a top view partly in section, of the lower portion of the bulb feeding mechanism of the machine comprising our invention; Fig. 7 is a fragmentary rear elevation of the machine comprising our invention showing the switch and associated cam for making and breaking the electrical circuit through the solenoid of the bulb release mechanism shown in Fig. 6; Fig. 8 is a vertical section taken on the line 8—8 of Fig. 5; Fig. 9 is a perspective view of the bulb centering device located at station A6 of Fig. 1; Fig. 10 is a side elevation, partly in section of the burner at station A7 for heating the bulb neck immediately prior to the cracking-off thereof; Fig. 11 is a section on line 11—11 of Fig. 13, and Fig. 12 a perspective view, of the bulb neck crack-off mechanism located at station A8; Fig. 13 is a vertical sectional view of the bulb neck crack-off mechanism at station A8, the upper portion of the view being taken on the line 13—13 of Fig. 1 and the lower portion being taken on the line 13'—13' of Fig. 2; Fig. 14 is a perspective view of the glazing burner unit located at stations A9 and A10; Fig. 15 is a fragmentary front elevation of the machine comprising our invention showing the valve mechanism for supplying compressed air and vacuum to various parts of the machine; Fig. 16 is an end elevation of the valve mechanism shown in Fig. 15; Fig. 17 is a vertical section of the transfer wheel mechanism taken on the line 17—17 of Fig. 1; Fig. 18 is a fragmentary plan view, partly in section, of the transfer wheel mechanism shown in Fig. 17; Fig. 19 is a front elevation, partly in section, of the transfer wheel with the bulb holders of the associated turrets "A" and "B" shown in proper bulb transfer relation thereto; Fig. 20 is a section taken on the line 20—20 of Fig. 19; Fig. 21 is a section taken on the line 21—21 of Fig. 20; Fig. 22 is a vertical section of the second or "B" turret of the machine comprising our invention, the section being taken on the line 22—22 of Fig. 23; Fig. 23 is a fragmentary plan view of the "B" turret shown in Fig. 22 with the upper or chuck support section thereof broken away to more clearly illustrate the intermediate section of the turret; Figs. 24 and 25 are fragmentary vertical sections, taken on the lines 24—24 and 25—25 respectively of Fig. 23, of the intermediate section of the "B" turret; Fig. 26 is a vertical section, on line 26—26 of Fig. 23, of one of the bulb chucks on the "B" turret; Fig. 27 is a horizontal section taken on the line 27—27 of Fig. 26; Fig. 28 is a perspective detail view of the cover plate of the bulb chuck shown in Figs. 26 and 27, the view showing the under side of the cover plate; Fig. 29 is a vertical section of the bulb centering and positioning mechanism at station B5 of the "B" turret and showing one of the bulb chucks on the "B" turret in proper operating position relative to the said mechanism; Fig. 30 is an elevation of one of the burners at stations B6 to B15 of the "B" turret and showing one of the bulb chucks partly in section in operative relation thereto; Fig. 31 is a vertical section on line 31—31 of Fig. 1 of the bulb tipping or denting mechanism at station B16, the mechanism being shown in its actuated or operative position; Fig. 32 is a front elevation of the mechanism shown in Fig .31; Fig. 33 is an enlarged detail section on line 31—31 of Fig. 1 of the punch head portion of the bulb tipping mechanism at station B16; Fig. 34 is a front elevation partly in section of the bulb ejecting mechanism at station B19; Fig. 35 is a vertical section, partly in elevation, on the line 35—35 of Fig. 34; and Fig. 36 is an elevation, partly in section, of the chuck cleanout air jet arrangement at stations B20 and B21.

The operation, in general, of the machine according to the invention consists in the feeding of a bulb to the first of two turrets on the machine, where the closed end of the bulb neck is first cut off, and then the transfer of the bulb, by automatic transfer mechanism, from the first to the second turret of the machine where the bulb is tipped or dented by suitable denting mechanism.

Referring to the drawings, the machine according to the invention comprises a hollow rectangular-shaped base or housing member 10 having mounted, on the top thereof, a pair of indexing turrets or carrier members A and B. The turrets A, B are disposed adjacent opposite ends of the machine bed housing 10 and are arranged to rotate in a horizontal plane about a vertical axis and in a counterclockwise direction, as viewed in plan. For this purpose, turret A is mounted on a vertically extending spindle 11 (Fig. 3) which is journaled in suitable ball bearings 12 mounted in a flanged turret bearing 13. The said turret bearing 13 is bolted to the machine bed or housing 10 over an opening 14 therein, and the turret spindle 11 extends down through the turret bearing 13 so as to project into the interior of the machine housing 10.

Turret A, which is the first turret to which the bulb is fed during the course of operation of the machine, is suitably secured, as by bolts 15, to a support flange 16 integral with and extending radially outward from the upper end of the spindle 11. The turret A is provided with a plurality (preferably sixteen) of hollow cylindrical extensions or head housings 17 extending radially outward from the periphery of the turret at uniformly spaced points therearound.

Rotatably mounted within each head housing 17 so as to rotate about a horizontal axis extending radially of the turret A, is a head 18 comprising a hollow spindle 19 provided at its outer end with a suction type bulb holder 20 projecting radially outward from the head housing 17. The spindle 19 is rotatably supported in the head housing 17 by means of suitable ball or roller bearings 21 to thereby provide the rotatable mounting for the head 18 in the head housing 17. The bulb holder 20 is provided with a bulb engaging socket or recess 22 in its outer end for supporting a bulb 23, neck outward, in a horizontal position therein with the closed neck end 24 of the bulb projecting radially outward beyond the outer end of the holder. Inasmuch as the size and shape of the said bulb engaging socket 22 will be different for different sized and shaped bulbs, the bulb holder 20 is removably secured to the spindle 19, such as by a suitable threaded engagement as shown at 25, to thereby permit the interchange of bulb holders 20 having different sized and shaped sockets 22. The bulb holder 20 is further provided with a central bore 26 extending therethrough to thereby provide communication between the bulb socket 22 and the hollow interior of the spindle 19.

The inner end of each head spindle 19 extends into a bore 27 in the turret A, the hollow interior of the spindle thus opening into and communicating with the said bore. The bore 27 extends radially inward of the turret A from the inner wall 28 of an annular channel 29 formed in the under surface of the turret. A sealing washer unit 30 is compressed into the annular space between the spindle 19 and the wall of the bore 27 to thereby provide a more or less hermetic seal between the said spindle and bore.

Each bore 27 is provided, adjacent its inner end, with a pair of valve ports 31, 32 spaced apart longitudinally of the bore, the said ports consisting of vertical bores extending upwardly from the horizontal bore 27 to the top surface of turret A. The turret A, with its pair of valve ports 31, 32 for each head 18, thus constitutes one-half of a rotary valve for connecting each head either to a source of vacuum or to a source of air under pressure, depending upon the particular location of the head and its associated pair of valve ports 31, 32 during the rotary travel of the turret A. The other half of the said rotary valve is composed of a stationary top or cover plate 33 which rests flat against the upper surface of the turret so as to cover the valve ports 31, 32 therein. The cover plate 33 is held in place against rotation by means of an arm 34 bolted at one end to the said cover plate and at the other end to the housing 10.

The under surface 33' of the cover plate 33 is provided with an arcuate channel or vacuum manifold chamber 35 (Figs. 1 and 3) concentric with the turret A and in line with the rotary travel of the innermost valve ports 31 so as to communicate therewith. The said channel 35 is connected by pipe 56 to a source of vacuum, such as a vacuum pump, and extends from a point just preceding station A—1 to a point intermediate stations A12 and A13, as shown in Fig. 1. As a result, each head 18 is continuously connected to a vacuum through the chamber 35 and pipe 56 from the time the head reaches the first or loading station A—1 until it reaches the point intermediate stations A12 and A13 where the innermost valve port 31 passes beyond the terminal end of the chamber 35.

For providing a continuous vacuum, however, in each head 18 during the entire indexing movement thereof from stations A12 to A13, the under surface 33' of the cover plate 33 is further provided with a second, relatively short arcuate channel or recess 37 (Figs. 1 and 3) concentric with the turret A and in line with the rotary travel of the outermost valve ports 32 so as to communicate therewith. The said recess 37 extends from a point opposite but slightly overlapping the terminal end of the main vacuum chamber 35 to a point just beyond station A13. The recess 37 is connected by pipes 38, 38' and 38" (Figs. 1, 3 and 15) to a pair of cam operated poppet valves 159, 160 (Figs. 2 and 15) for first connecting the said recess to a vacuum during the interval when the outermost valve port 32 is traversing the recess, and then connecting the said recess to a source of compressed air, or other suitable gas under pressure, after the head 18 reaches and is positioned at the discharge station A13.

It is thus evident that the two chambers 35 and 37, together with their co-operating valve ports 31 and 32, respectively, provide a continuous connection of each head 18 to a vacuum from the time the head first reaches the loading station A—1 until it finally reaches the discharge or transfer station A13. In addition, the aforementioned poppet valves 159 and 160, which serve to connect each head 18 to a source of compressed air after the head reaches the discharge station A13, accordingly constitute means for providing a blast of air in each head at the said station A13 for expelling the bulb 23 held therein.

As a check to insure the ejection of the bulb 23, or any broken fragments thereof, from the head 18 after the latter has passed the discharge station A13 but before it again reaches the loading station A—1, a blast of air or other suitable gaseous medium under pressure, is passed through the head during the course of its movement from stations A13 to A—1. For this purpose, the cover plate 33 is provided with a vertical bore 39 (Fig. 1) preferably located between stations A14 and A15 and in line with the path of rotary travel of the outermost valve ports 32 in the turret A. The said vertical bore 39 is connected by pipe 40 to a suitable source of compressed air or other gaseous medium under pressure so that when the valve port 32 of each head moves across the bore 39, as the turret indexes the heads from stations A14 to A15, a blast of air is forced through the head to eject any bulb or broken glass still remaining in the bulb holder 20.

The counterclockwise rotational indexing of the turret A is effected by means of a barrel type cam 41 (Figs. 3-4) keyed to a cross shaft 42 extending transversely of the machine and journaled in spaced bearings 43 supported in the housing 10. A disc 44, keyed to the lower end of the turret spindle 11, is provided with a plurality (only two being shown in Fig. 3) of depending tapered rollers 45, one for each head 18 of the turret A, which engage and ride in a helical groove 46 cut in the periphery of the barrel cam 41 to thereby index the turret. The cross shaft 42 is driven by a main drive shaft 47 through a worm gear drive comprising a worm gear 48 on the main drive shaft and a meshing worm wheel 49 keyed to the cross shaft 42. The main drive shaft 47 is journaled in spaced bearings 50 supported in the housing 10, and is in turn driven by a motor driven cross shaft 51 through a similar worm gear drive comprising a worm wheel 52 on the main drive shaft and a meshing worm gear 53 on the motor driven cross shaft 51. The said cross shaft 51 is journaled in bearings 54 supported in the housing 10 and is driven by an electric motor 55 through a belt drive, the forward ends of the cross shaft 51 and the motor shaft 56 being provided with pulleys 57, 58, respectively, which are connected by a belt 59.

For effecting counterclockwise rotation of the heads 18 in the turret head housings 17 (as viewed from the outer ends of the heads), the spindle 19 of each head is provided with a bevel pinion gear 60 which is fixedly mounted on the spindle adjacent the inner end thereof and in line with the annular channel 29 in the under surface of the turret. The said pinion gear 60 meshes with a bevel drive gear 61 keyed to a vertical shaft 62 extending through the hollow interior of the turret spindle 11. The bevel drive gear 61 extends laterally out between the turret A and the turret support flange 16 through a shallow chamber 63 formed in the under surface of the turret. The vertical shaft 62 is journaled adjacent its upper end in a ball bearing 64 mounted in the hollow turret spindle 11. At its lower end, the said shaft 62 is journaled in a bearing 65 mounted on the housing 10. The vertical shaft 62 is driven by a cross shaft 66 (Figs. 3-4) through a worm gear drive comprising a worm wheel 67 mounted on the lower end of the vertical shaft 62 and a meshing worm gear 68 mounted on the cross shaft 66. The said cross shaft 66 is journaled in spaced ball bearings 69 mounted in the housing 10, and is driven by the electric motor 55 through a belt drive, the forward end of the said shaft 66 being provided with a pulley 70 which is connected by a belt 71 to a pulley 72 on the motor shaft 56.

At the first or loading station A—1 of the machine, the bulb 23 to be operated on is automatically fed to the turret head 18 positioned at the said station. The bulb 23 is fed to the machine from an automatic feeding device similar to that described and claimed in Fagan et al. United States Patent No. 1,536,833, issued May 5, 1925, and comprising, in part, an inclined slotted guideway or tube 73 (Figs. 5-6) rigidly secured to a bracket 74 fastened to the machine housing 10. The bulbs 23 to be fed to the machine are inserted in the tube or chute 73, with their closed neck ends 24 extending downwardly through a longitudinal slot 75 in the chute, by automatic loading mechanism (not shown) similar to that described and claimed in the said Fagan et al. patent. The bulbs 23 slide down the chute 73 to a release or escapement mechanism 76 (Fig. 6) located a short distance up from the lower end of the chute, where the bulbs are eventually released, one by one, as successive heads 18 on turret A are indexed to the loading station A—1 opposite the lower or discharge end of the chute 73.

As shown in Figs. 5 and 6, the bulb release mechanism 76 comprises a pair of substantially horizontally disposed reciprocatable plungers or pins 77, 78 spaced apart longitudinally of the chute or slide 73 and extending thereinto through apertures in the side wall of the chute. The said pins 77, 78 are slidably mounted in openings 79 in a support or guide block 80 rigidly attached to the side of the chute 73. Coil springs 81, disposed in the openings 79 in block 80, and fitting over the pins 77, 78, constantly urge the said pins outwardly of the chute 73 and into engagement with the inner side 82 of a reciprocatable bar or cam 83 slidably mounted in the support block 80 to reciprocate across the outer ends of the pins 77, 78. The said inner side 82 of the cam bar 83 is provided with a V-shaped identation or notch 84 which is alternately disposed opposite the end of each pin 77, 78 as the bar 83 reciprocates.

For effecting reciprocation of the notched bar or cam plate 83, one end of the said bar is connected by link 85 to the movable armature or plunger 86 of a solenoid 87 fixedly secured to the chute 73. The other end of the cam bar 83 is connected to one end of a tension coil spring 88 which is fastened at its other end to a bracket 89 rigidly secured to the support block 80. When the solenoid 87 is energized, the movable armature 86 pulls the cam bar 83 in one direction across the outer ends of the pins 77, 78 against the resistance of the coil spring 88, which on de-energization of the solenoid, the tension of the coil spring 88 pulls the bar 83 back in the opposite direction. The movement of the bar 83 is limited in one direction by the engagement of the inner end 86' of the solenoid armature or plunger 86 with a stop 90 within the solenoid, while movement in the other direction is limited by the engagement of a stop pin 91 on the cam bar 83 with the side wall 80' of the support block 80.

The solenoid 87 is alternately energized and de-energized by a switch 92 through which the solenoid is connected, by leads 93, 94 and 95 to a source of current, as shown in Figs. 6 and 7. The said switch 92 is mounted on the rear of the machine housing 10 adjacent the rear end of shaft 42 (Fig. 4), and it is opened and closed by the action of a cam 96 mounted on the rear end of said shaft, the switch being provided with an operating arm 97 having a roller 98 at its free end which engages the cam surface 99 of the cam 96.

The spring plungers or pins 77, 78 are spaced apart longitudinally of the chute 73 a distance approximately equal to, but preferably a little less than, the width of one of the bulbs 23, and by reason of the action of the solenoid 87 and spring 88 on the cam bar 83, the said bar is caused to reciprocate and to cause the pins 77 and 78 to alternately move into, and hold back, the line of bulbs 23 in the chute. Thus, when the upper pin 78 is in its retracted position, the lower pin 77 is in its innermost position (as shown in dotted lines in Fig. 6) and so acts as a gate to hold back the entire line of bulbs 23 in the chute. However, when the position of the pins 77, 78 is reversed so as to retract the lower pin 77 and move it out of the path of travel of the bulbs down the chute, then the lowermost bulb 23 in the chute is free to slide down the chute to the lower or discharge end of the chute. At the same time, the upper pin 78, by reason of the movement thereof to its innermost position, acts as a gate to hold back the remainder of the line of bulbs in the chute, as shown in Figs. 5 and 6. On the next reversal of the position of the pins 77, 78, the retraction of the upper pin 78 allows the entire line of bulbs in the chute to slide down until the lowermost bulb in the line abuts against the lower pin 77, which is then in its innermost position. The said lowermost bulb thus moves down into the position occupied by the bulb previously released, and is therefore in a position to be released by the next reversal of the position of the pins 77, 78.

The bulb release or escapement mechanism 76, through the action of cam 96 on the switch 92 controlling the solenoid 87, is operated in timed relation with the movement and positioning of the heads 18 on turret A so as to release a single bulb 23 each time a head 18 is positioned at the loading station A—1 opposite the discharge end of the chute 73. Secured to the lower end of the tube or shute 73 is an end piece or guide 100 having a tongue 101 extending a short distance up into the chute slot 75 so as to obstruct the same. As the released bulb 23 slides down the chute in an upright position, the depending neck portion 24 of the bulb strikes the curved end wall 102 of the tongue 101, thus causing the bulb to be inverted or tipped over (as shown in dotted lines in Fig. 5) and to slide, bulbous portion first, down the remainder of the chute.

The end piece or shoe 100 is provided with a horizontally extending bulb guiding portion 103 which projects out from the lower end of the chute 73 to form a lip thereon serving to guide the bulb horizontally into the bulb holder 20 on the turret A. As the bulb approaches the end of the lip 103, it is drawn into and held in the bulb holder 20 by the suction in the said holder. To prevent overturning of the bulb as it enters the bulb holder 20, the lip 103 of the end piece 100 is formed with an upstanding loop-shaped guard 104 (Figs. 5 and 8) which entirely surrounds the bulb except for a small opening 105 at one side thereof through which the bulb can pass as it is indexed from station A—1 to station A—2 by the turret A.

To enable the feeding of various sized bulbs to the turret A, various parts of the bulb feeding mechanism, such as the chute 73, support block 80, cam bar 83, etc., are made interchangeable with similar parts of different dimensions so as to accommodate such different sized bulbs.

After a bulb 23 has been fed to one of the heads 18 of the turret A, the latter then successively indexes the said head through stations A2 to A5, which are idle stations, and thence to station A6 where, as shown in Fig. 9, the projecting neck 24 of the bulb is engaged by a straight upper edge 106 on an arcuate-shaped stationary aligning bar or plate 107 to thereby align the bulb neck with the axis of rotation of the bulb holder 20. The said aligning or centering bar 107 is supported on a bracket 108 secured to the machine frame or housing 10, the bar being fastened to the bracket by an adjustable mounting for permitting vertical adjustment of the bar to the correct position for centering or aligning the bulbs 23 in the holders 20.

From station A6, each head 18 is then indexed to station A7 where highly concentrated pin-point flames 109 from a burner 110 are directed against the neck 24 of the rotating bulb at the point where the neck is to be severed, as shown in Fig. 10. The burner 110 is supported on a bracket 111 secured to the machine housing 10 as by bolts 111', and is connected, through a mixing valve and connecting pipes (not shown), to sources of hydrogen and oxygen. In order to enable proper location of the burner fires 109 relative to the bulb neck 24, the burner 110 is adjustably mounted on the bracket 111 for vertical adjustment thereon, while the bracket 111 is adjustably mounted on the machine housing 10 for movement radially inward and outward of the turret A. Inasmuch as the bulb 23 is continuously rotated while it is being heated by the burner fires 109 at station A7, the bulb neck 24 is accordingly heated uniformly around its entire circumference by the said burner fires.

Following the heating of the bulb neck 24 at station A7, the head 18 carrying the heated bulb is then indexed to station A8 where the closed outer end of the bulb neck is cracked off by the engagement of a chilled metal crack-off wheel or disc 113 with the annular heated zone of the rotating bulb neck. The said crack-off wheel 113 constitutes part of a crack-off mechanism 112 (Figs. 11-13) located at the said station A8 and is formed with a relatively thin, flattened edge or periphery 113'. The contact of the chilled edge 113' of the crack-off wheel with the hot glass of the bulb neck causes the glass to instantly crack along the highly localized annular heated zone of the bulb neck, thus severing the outer closed end of the bulb neck from the rest of the bulb.

The metal crack-off wheel 113 is rotatably mounted on one end of a rocker arm 114 arranged to rock in a vertical plane to thereby move the wheel 113 vertically into and out of engagement with the bulb neck 24. The wheel 113 and rocker arm 114 are disposed within a cooling liquid reservoir or casing 115 filled with a cooling liquid 116, such as water, in which liquid the wheel is fully immersed, by the movement of the rocker arm, after each cracking-off operation. The rocker arm 114 is pivotally mounted between its ends on a shaft 117 supported in the casing 115. The end 118 of the rocker arm opposite that end thereof provided with the crack-off wheel 113, is connected by a vertically extending link element 119 to a bracket 120 rigidly fastened to the upper end of a vertically reciprocatable rod 121, as by a nut 122. The reciprocating movement of the rod 121 is thus transmitted by the link 119 to the end 118 of the rocker arm to thereby effect the rocking movement of the said arm.

The connecting link 119 comprises a tie rod or bolt 123 (Fig. 11) having a head 124 at one end thereof pivotally connected to the end 118 of the rocker arm 114. The other end of the tie bolt 123 extends up through an opening in the bracket 120 so as to freely slide therethrough. A nut 125 threaded onto the upper end of the tie bolt 123 provides a stop against which the bracket 120 abuts, on upward movement of the rod 121, to thereby pull the bolt 123 and the rocker arm end 118 in an upward direction. Downward movement, however, of rod 121 is transmitted to the rocker arm end 118 through a compression coil spring 126 which surrounds the tie bolt 123 and bears at one end against the under surface of the bracket 120 and at the other end against the tie rod head 124. Downward movement of the rod 121 thus raises and presses the crack-off wheel 113 into engagement with the bulb neck 24 through the compressive resistance of the coil spring 126.

The reciprocatable rod 121 is slidably mounted in a vertically elongated lateral extension or bearing 127 on the casing 115. To prevent rotational movement of the bracket 120 by reason of the turning of the associated rod 121 in its bearing 127, suitable guiding or rotational locking means are provided therefor comprising a vertically extending guide rod 128 threaded into the upper end of the casing extension 127 and extending upwardly therefrom through a guide opening 129 in the bracket 120 so that the latter freely slides along the guide rod 128 as the rod 121 reciprocates.

The rod 121 is reciprocated by a second vertically reciprocatable driving rod 130 (Figs. 12-13) slidably mounted in an upstanding bearing 131 secured to the machine housing 10, the two rods 121 and 130 being rigidly interconnected by a cross arm or tie rod 132 to thereby form a unitary sliding rod assembly. The driving rod 130 extends down through the machine housing 10 and into a rectangular-shaped shallow recess 133 in the front wall of the housing. As shown in Figs. 2, 12 and 13, the lower end of the driving rod 130 rests against a roller 134 rotatably mounted on one arm of a bell crank lever 135 which is disposed within the said recess 133 and is pivotally mounted, at its center, on a stud 136 secured to and extending out from the recessed front wall portion 137 of the machine housing 10. The other arm of the lever 135 is also provided with a roller 138 which engages the periphery or working surface 139 of a cam 140 keyed to the front end of cross shaft 42.

The reciprocating rod unit, comprising the two reciprocating rods 121 and 130 together with the tie rod 132, is constantly urged downwardly by a compression coil spring 141 (Fig. 11) disposed within the casing extension 127. The said spring 141 surrounds the rod 121 and bears at its upper end against a shoulder 143 within the casing extension 127 and at its lower end against a head 144 on the said rod 121. The action of the spring 141 forces the lower end of rod 130 down into engagement with the roller 134 on lever 135 so that the other roller 138 on said lever is, in turn, continuously pressed against the working surface of the cam 140.

It is thus apparent that, through the action of the cam 140 and the spring 141, the reciprocating rod assembly, comprising the rods 121 and 130 and the tie rod 132, is alternately moved up and down to thereby rock the rocker arm 114 and so move the crack-off wheel 113 up and down into and out of engagement with the neck 24 of the bulb 23 positioned at the crack-off station A8. To insure contact of the chilled crack-off wheel 113 with the bulb neck 24 around the entire circumference thereof, the working surface 139 of the cam 140 is so shaped as to provide a relatively extended period of time during which the crack-off wheel 113 is in engagement with the rotating bulb neck while the bulb is positioned at the crack-off station A8.

Inasmuch as the support of the bulb 23 in the holder 20 is in the nature of a more or less ball and socket arrangement, the engagement of the crack-off wheel 113 with the protruding neck portion 24 of the bulb normally tends to pivot the bulb in the holder so as to throw the axis of the bulb off line with the axis of rotation of the holder. To prevent such pivotal movement of the bulb in the holder 20 and thus insure proper crack-off of the bulb neck, suitable supplementary holding or locking means for the bulb is provided at the crack-off station A8, the said locking means comprising a fork-shaped guard member 145 which is arranged to be moved down over the neck 24 of the bulb so as to engage opposite sides of the bulb neck at a point radially outward of the point of engagement of the bulb neck with the crack-off wheel 113. The said guard member 145 is secured to the lower end of a vertical rod 146 which is adjustably mounted on an L-shaped bracket 147 rigidly attached to the upper end of the vertically reciprocatable rod 130. The fork-shaped guard 145 thus reciprocates with the reciprocating drive rod 130 so that when the said rod 130 moves down to thereby raise the crack-off wheel 113 into engagement with the bulb neck, the fork-shaped guard 145 will simultaneously move down around the bulb neck 24 so as to firmly hold the bulb in proper alignment in the bulb holder during the engagement of the crack-off wheel with the bulb neck.

To prevent the severed portion of the bulb neck from dropping into the water reservoir casing 115, a V-shaped cover 148 is provided therefor, as shown in Figs. 12 and 13. The said cover thus deflects the free falling severed bulb neck portion to one side of the reservoir casing 115. If desired, a chute 149 (Figs. 1 and 12) may be mounted adjacent the front side of the casing 115 to receive the severed bulb neck portions and convey them to a suitable waste collecting container (not shown).

From the neck crack-off station A8, each head 18 is successively indexed to stations A9 and A10 where the cut edge or end 150 of the projecting bulb neck 24 is heated, by gas flames 151 directed thereagainst from burners 152 and 153 (Fig. 14) at said stations, to thereby glaze or smooth the said edge of the bulb neck. The burners 152, 153 are adjustably supported on a bracket 154 adjustably secured to the machine housing 10, and are connected, by pipes 155 and 156, respectively, to a supply of gaseous combustion admixture ingredients, such as oxygen and hydrogen.

After the glazing of the end of the bulb neck at stations A9 and A10, the head 18 carrying the bulb 23, is then indexed through an idle station A11 and thence to station A12 where the bulb is again aligned in the holder 20 by engagement with a straight upper edge on a stationary aligning bar or plate 158 (Fig. 1) similar to the other aligning bar 107 (Fig. 9) at station A6. Like the said bar 107, the bar 158 is adjustably mounted on a bracket 108 adjustably secured to the machine housing 10, and serves to realign the bulb in the holder following the neck crack-off operation and preparatory to the transfer of the bulb to a transfer mechanism at the ensuing station A13.

From station A12, the head 18 is indexed to the bulb discharge station A13 where the bulb 23 held in the said head is transferred from the bulb holder 20 to an opposed holder 161 on a second carrier member or transfer wheel T rotatably mounted on the machine housing 10. The transfer of the bulb is effected by the interruption of the vacuum in the head 18 to first release the bulb in the holder 20, followed by the immediate passage of a blast of air through the head 18 to eject the bulb therefrom and into the opposed holder 161 of the transfer wheel where it is retained by a vacuum in the said holder 161.

The interruption of the vacuum in the head 18 occurs when the said head reaches the discharge station A13, and is effected by the closing of the vacuum-supply valve 159 which is connected by pipes 38 and 38' (Figs. 3 and 15) to the recess 37 in the turret cover plate 33. The ensuing puff of air in the head 18 is then produced by the opening of the low-pressure air valve 160 which is likewise connected by pipes 38 and 38" to the recess 37 in the turret cover plate 33.

As shown in Fig. 15, each of the valves 159, 160 comprises an elongated hollow body portion 162 fastened to the front wall of the machine housing 10 within the recess 133 therein and adjacent the forward end of a cross shaft 164 driven by the main drive shaft 47 through a worm gear 165 and a meshing worm wheel 166 (Fig. 4). Slidably mounted within the hollow interior 163 of the valve body is a valve pin 167 having a tapered head 168 at one end thereof adapted to seat against a valve seat 169 formed in the hollow interior of the valve body. The other end of the valve pin 167 projects outwardly beyond the valve body 162 for engagement with a cam 170 or 171 mounted on the shaft 164. The valve is normally maintained in a closed position, with the valve head 168 seated against the valve seat 169, by a compression coil spring 172 disposed within the hollow interior 163 of the valve body 162. The said spring 172 bears at one end against the valve pin head 168 and at its other end against a closure cap 173 threaded into the valve body 162.

The hollow interiors 163 of the two valves 159, 160, at one side of the valve seats 169 therein, are interconnected by pipes 38', 38" and also communicate with the recess 37 in the turret cover plate 33 through the pipe 38 which connects with the pipes 38', 38". The hollow interior of valve 159, at the other side of the valve seat 169 therein, is connected by pipe 174 to a source of vacuum, while the hollow interior of valve 160, at the other side of the valve seat 169 therein, is connected by pipe 175 to a supply of compressed air at relatively low pressure.

The vacuum supply valve 159 is operated by cam 170, while the low pressure air valve 160 is operated by cam 171. The working surfaces 176, 177 of the two cams 170, 171 are so shaped that when one of the valves 159, 160 is opened, the other closes, and vice versa, so that a vacuum or air pressure is alternately supplied through pipe 38 to the recess 37 and thus to each head 18 when positioned at station A13. In addition, the operation of the cams 170, 171, and therefore the valves 159, 160, is so timed with the indexing movement and positioning of the turret A as to supply vacuum to the turret heads 18 during the interval when they are indexing from stations A12 to A13, and then to supply air pressure to the said heads after they have reached, and are positioned at, the discharge station A13. The resulting puff of air in each head 18, when it is positioned at the discharge station A13, thus ejects the bulb 23 therefrom and into the opposed holder 161 of the transfer wheel T.

The said transfer wheel T is rotatably mounted on top the machine housing 10 adjacent the periphery of turret A, and is arranged to rotate in a counterclockwise direction (as viewed from the front of the machine) about a horizontal axis disposed at right angles to the axis of rotation of each turret head 20 when positioned at the discharge station A13. As shown in Figs. 17–19, the rotational mounting of the transfer wheel T comprises a horizontal cross shaft 178 extending across the top of the machine housing at right angles to the vertical plane common to the axes of rotation of the two turrets A and B, the transfer wheel being mounted on and keyed to the said shaft 178. At its forward end, the said shaft 178 is journaled in a ball bearing 179 (Fig. 17) mounted in an upstanding support bracket 180 bolted to the machine housing 10. The rear end of the said shaft 178 is likewise journaled in a ball bearing 181 mounted in a horizontally extending portion 182 of an L-shaped shaft housing 183 the vertical portion 184 of which is bolted to the machine housing 10 over an opening 185 therein.

The transfer wheel T is provided with a plurality (preferably twelve) of bulb holders 161 each comprising a cylindrical socket member 186 (Fig. 20) extending radially out from the periphery of the transfer wheel and secured in a recess 187 therein by a sleeve-type nut 188 threaded into the said recess. The nut 188 surrounds the socket 186 and is screwed down against an annular shoulder 189 on said socket whereby the latter is forced inwardly of the recess and clamped between the bottom 190 of the recess and the said nut 188. Rotation of the socket member 186 in the recess 187 is prevented by a locking pin or key 191 (Figs. 20 and 21) which is secured by a press fit in an opening 192 in the body of the transfer wheel T and projects into a keyway or groove 193 in the bulb socket 186.

Each bulb socket 186 is formed with a longitudinal bore 194 extending therethrough, within which bore the bulb 23 is received. At a point inwardly thereof, the said bore 194 is reduced in diameter, as indicated at 195, to provide an annular ledge 196 which serves as a seat for the bulb 23. The engagement of the bulb with this ledge 196 provides the vacuum seal which is necessary for the retention of the bulb within the holder 161 by the suction therein. The bore 194 communicates with an aligned radial bore 197 in the transfer wheel which bore in turn communicates with a transverse bore 198 in the transfer wheel. The said bore 198 extends to the rear side or face 199 of the transfer wheel and serves as a valve port for connecting the bulb holder 161 either to a vacuum or to a source of compressed air at certain positions of the holder during the rotation of the transfer wheel.

To prevent the passage of broken glass fragments into the vacuum line, the reduced diameter bore portion 195 is partially closed, at its inner end, by a plug member 200 which is secured in the said bore portion 195 by a press fit and is provided with a plurality (preferably four) of openings or passageways 201 of relatively small size. To further guard against the passage of broken glass fragments into the vacuum line, a catch screen 202 (Fig. 20) is disposed within the bore 197, the said screen extending across the said bore so as to trap any such glass fragments.

The transfer wheel T, with its valve port 198 for each holder 161, constitutes, in effect, one-half of a rotary valve for connecting each holder either to a vacuum or to a supply of compressed air, as stated above. The other half of the said rotary valve comprises a disc-shaped stationary ring 203 which bears flat against the rear face 199 of the transfer wheel and overlies or covers all the valve ports 198 therein. The said stationary valve member is mounted on the transfer wheel shaft 178 through a roller bearing 204 (Fig. 17) and is firmly pressed against the rear face 199 of the transfer wheel by a pair of compression coil springs 205 (Fig. 18) which are disposed in wells 206 in the shaft housing portion 182 and bear at one end against the stationary valve disc member 203 and at the other end against the bottom 207 of the wells 206. Rotation of the valve disc member 203 on the shaft 178 is prevented, and the said member thereby held stationary, by a locking tongue or lug 208 extending forwardly from the front end of the shaft housing portion 182 and snugly fitting in a matching recess 209 formed in the rear end or rim of a hub 210 on the said stationary valve disc member.

The transfer wheel T is rotated by the shaft 178 to which it is keyed, the said shaft being driven by a vertical shaft 211 (Fig. 17) through a pair of meshing bevel gears 212 and 213 mounted on the rear end and upper end, respectively, of the said shafts 178 and 211. The said vertical shaft 211 extends through the vertical portion 184 of the shaft housing 183 into the hollow interior of the machine housing 10, and is journaled in ball bearings 214 mounted in the said shaft housing portion 184. Keyed to the lower end of the vertical shaft 211 is a disc 215 provided with a plurality of depending tapered rollers 216, one for each holder 161 on the transfer wheel, which are adapted to engage and ride in a helical groove 217 in a barrel cam 218 keyed to a short cross shaft 219. The said cross shaft 219 is journaled in ball bearings 220 (Fig. 4) mounted in the machine housing 10, and is driven by the main drive shaft 47 through a worm gear drive comprising a worm gear 221 on the main drive shaft 47 and a meshing worm wheel 222 on the cam shaft 219.

The rotational indexing of the transfer wheel T is timed with the rotational indexing of turret A in such a way that one of the bulb holders 161 on the transfer wheel is positioned at the bulb receiving station T1 (Fig. 19) a short instant before one of the heads 18 on turret A reaches the corresponding bulb discharge station A13. In addition, the transfer wheel T and turret A are so located relative to one another as to position their respective bulb holders 20 and 161 sufficiently close to one another, when the said holders are positioned in opposed relation at the transfer station, to cause the projecting portion of the bulb to extend at least part way into the bulb holder 161 on the transfer wheel T, as shown in Fig. 19. This particular positioning of the bulb holders 20 and 161 at the transfer station, so as to position the projecting neck end 24 of the bulb partially within the transfer wheel holder 161, is absolutely essential to the effective transfer of the bulb 23 from the turret holder 20 to the transfer wheel holder 161, for if the bulb does not project at least part way into the bulb, the ensuing puff of air which is passed through the bulb holder 20 to eject the bulb therefrom will then actually create a partial vacuum instead such as will cause the bulb to simply float in mid-air in a position between the two bulb holders 20 and 161. To enable the projecting neck portion 24 of the bulb 23 in the turret holder 20 to enter the transfer wheel bulb holder 161 during the indexing of the holder 20 to the transfer station A13, the wall of the transfer wheel holder 161 is provided with a notch 223 extending back from the outer end of the holder and in line with the path of travel of the bulb neck 24. The bulb neck can then pass through the notch 223 and safely enter the hollow interior 194 of the transfer wheel bulb holder 161, as shown in Figs. 18 and 19.

For supplying a continuous vacuum to each holder 161 from the time it first reaches the bulb receiving station T1 until it reaches a point just short of the bulb releasing station T4, the flat front or seating face 224 of the stationary valve member 203 is provided with an arcuate channel or vacuum manifold chamber 225 (Figs. 18-20) concentric with the transfer wheel T and in alignment with the valve ports 198 therein. The said chamber 225 extends from a point just preceding station T1 to a point just short of station T4, and is connected by pipe 226 to a source of vacuum. The suction thus created in the holder 161 retains the bulb 23 therein.

Following the transfer of the bulb 23 from the holder 20 in turret A to the holder 161 on the transfer wheel, the latter then successively indexes the holder 161 downwardly through idle stations T2 and T3 and thence to the vertically down bulb release station T4 where the bulb is released and drops down into a chuck 227 on turret B. During the indexing of the holder 161 from station T3 to T4, the vacuum therein is cut off a short instant before the holder reaches the bulb release station T4 by reason of the passage of the valve port 198 beyond the terminal end of the vacuum manifold chamber 225. The bulb is then free to drop out of the holder 161, but due to the fairly rapid rate of index movement of the transfer wheel, the holder reaches the bulb release station T4 before the bulb actually drops out of the holder.

To facilitate the transfer of the bulb 23 from the holder 161 to the chuck 227 on turret B a puff of air is passed through the holder at station T4 to eject the bulb therefrom. For this purpose, the stationary valve disc member 203 is provided with a small bore 228 (Figs. 17 and 19) in line with the path of travel of the valve ports 198 and located a slight distance beyond the release station T4 in a position where it is slightly overlapped by the ports 198 when their associated holders 161 are stationed at the bulb release station T4, as shown in Fig. 19. The said bore 228 is connected by pipe 229 to a source of compressed air for producing the puff of air in the holder 161.

Following the transfer of the bulb 23 from the holder 161 on the transfer wheel to the chuck 227 on turret B, the said holder 161 is then successively indexed through idle stations T5 to T12 and thence back to the bulb receiving station T1. However, as a check to insure the ejection of the bulb 23, or any broken fragments thereof, from the holder 161 before the holder reaches the bulb receiving station T1, a clean-out blast of air is passed through the holder at a suitable point along its path of travel back to the said station T1. For this purpose, the stationary valve disc member 203 is provided with a bore 230 (Fig. 19) preferably located between stations T6 and T7 and in line with the path of travel of the valve ports 198. The said bore 230 is connected, through a communicating radial bore 231 in the valve disc member and a pipe 232, to a source of compressed air for providing the blast of air in each holder 161 as it indexes from station T6 to T7.

As shown in Figs. 22 and 23, the turret B on which the chuck 227 is mounted comprises a flattened outer ring or chuck support section 233, an intermediate flanged hub section 234, and an inner flanged hub section 235, bolted together to form a unitary structure. The said turret unit is mounted on the upper end of a vertical hollow shaft 236, the inner hub section 235 being keyed to the said shaft 236. The hub section 235 rests on an annular shoulder 237 on the shaft 236 and is held tightly thereagainst by a nut 238 threaded onto the upper end of said shaft. The turret support shaft 236 is journaled in suitable ball bearings 239 mounted in a flanged turret bearing member 240 bolted to the upper wall of the machine housing 10 over an opening 241 therein. To support the shaft 236 and the associated turret unit B in position in the bearings 239, a collar 242 is provided on the said shaft which rests on the upper side of the upper one of said bearings 239.

The turret B is rotatably indexed in a counterclockwise direction (as viewed in plan) by a barrel cam 243 (Figs. 4 and 22) keyed to the cross shaft 164 and provided with a helical groove 244 in its periphery. A disc 245, keyed to the lower end of the turret support shaft 236, is provided with a plurality (only two being shown in Fig. 22 of depending tapered rollers 246, one for each chuck 227 on the turret B, which engage and ride in the said helical groove 244 in the cam 243 to thereby index the turret. The rotational indexing of the turret B by the cam 243 is timed with the rotational indexing of the transfer wheel T in such a manner as to position one of the turret chucks 227 at the bulb receiving station B—1 a short instant before one of the bulb holders 161 on the transfer wheel is indexed to its position at the corresponding discharge station T4 directly above the said chuck 227.

In view of the tendency of the turret B to become heated by reason of the various heating operations performed on the bulb 23 while it is supported on the turret, it is preferable to provide suitable cooling means for the said turret. For this purpose, the intermediate section 234, which comprises a flange portion 247 and a hub portion 248, is provided with a series of three concentric annular ribs 249, 250 and 251 which extend upwardly from the flange portion 247 to thereby form three concentric chambers 252, 253 and 254 on the upper side of the said intermediate turret section 234. The upstanding ribs 249, 250 and 251 are braced, at spaced points therearound, by radially extending reinforcing webs 255, the said webs interconnecting the ribs with one another and with the hub portion 248 of the turret section 234.

The flattened ring or chuck support section 233 of the turret B rests on top the said ribs 249, 250 and 251 and covers the outermost and intermediate chambers 254 and 253 so as to completely close off the same. At its inner periphery, the ring section 233 is formed with an upturned flange 256 which is spaced a sufficient distance from the hub 248 of the intermediate section 234 to provide an annular space for the entry of a cooling liquid supply pipe 257 thereinto. The said pipe 257, which is suspended from a point above the machine and extends vertically down into the annular space between the flange 256 and the hub 248, is connected to a suitable supply of cooling liquid, such as water.

The flattened outer portion of the chuck support section 233 is provided with a plurality of V-shaped passageways 258 (Figs. 22—23), one between each adjacent pair of chucks 227 on the said section, for circulating the cooling liquid through the section 233. The two legs 259, 260 of the V-shaped passageways 258 extend inwardly of the section 233 in divergent fashion from a point adjacent the periphery of the said section, one of the legs 259 opening into the outer chamber 254 of the turret and the other leg 260 opening into the intermediate chamber 253 of the turret.

The innermost and outermost chambers 252 and 254 of the intermediate turret section 234 communicate with one another, at a point adjacent the bottoms thereof, through a plurality of tunnel-like passageways 261 located in the said turret section at spaced points therearound. The intermediate turret section 234 is also provided with a plurality of inclined overflow or outlet passageways 262 located at spaced points therearound and having their upper ends 263 located at a level somewhat above that of the V-shaped passageways 258 in the outer ring section 233. The passageways or conduits 262 communicate at their lower ends with short vertically extending outlet nipples 264 threaded into the intermediate turret section 234. The nipples 264 extend down through openings 265 in the inner turret section 235 into an annular trough 266 in the turret bearing member 240. An outlet pipe 267, threaded into the said bearing member 240, communicates with the annular trough 266 at the bottom thereof to thereby carry away the cooling liquid therefrom. In addition to the inclined outlet passageways 262, a single horizontally extending clean-out or drain passageway 268, connecting the outer chamber 254 with one of the outlet nipples 264, is also provided in the intermediate turret section 234, as shown in Fig. 24. The said clean-out passageway 268 is normally closed at its outer end by a removable plug 268'.

To prevent the creation of a vacuum in the intermediate chamber 253, by the outflow of the cooling liquid therefrom, such as would cause a siphoning of all the cooling liquid from the cooling system, a pair of small transversely extending passageways or channels 390 (Figs. 22–23) are provided in the annular seating ledge 391 on the under side of the chuck support section 233, the said channels being located at diametrically opposite points of the said ledge 391 which rests against the top edge of the innermost rib 249 on the intermediate turret section 234. The said passageways 390 thus connect the intermediate chamber 253 with the innermost chamber 252 so as to provide vents to the atmosphere for the said intermediate chamber which therefore serve to break the vacuum in such intermediate chamber.

In the operation of the cooling liquid system, the water or other cooling liquid from the supply pipe 257 flows into the inner chamber 252 and thence through the passageways 261 into the outer chamber 254. From the said outer chamber 254, the water then flows through the V-shaped passageways 258 in the outer ring or chuck support section 233 and thence into the intermediate chamber 253 where it overflows into the inclined outlet passageways 262 and passes down through the outlet nipples 264 into the annular trough 266 in the bearing member 240 and thence out through the outlet pipe 267. The flow of water through the inlet pipe 257 into the inner chamber 252 maintains the said chamber 252 filled up to a level even with or slightly above the top 263 of the overflow passageway 262, thus producing a more or less continuous overflow of water into the overflow passageway and therefore a continuous circulation of water through the V-shaped passageways 258 which then effectively cools the outer ring section 233 of the turret.

The chucks 227, of which there are preferably twenty-four located at spaced points around the turret ring section 233, are mounted on the upper surface of the said ring section adjacent the periphery thereof. Each of the chucks comprises a body portion 269 (Figs. 26 and 27) bolted to the said ring section 233 over a circular opening 270 therein. The chuck body 269 is provided with a circular opening 271 in alignment with the opening 270. Fitting in the openings 270, 271 is a bulb seating member or bushing 272 the upper face of which is provided with a conical recess 273 in which the bulb 23 is seated. The bushing 272 is supported in place by means of a collar 274 thereon which fits into an annular recess 275 in the under side of the chuck body 269 and rests on the upper surface of the turret ring section 233.

The chuck body 269 is provided with an enlarged circular recess 276 in its upper face. Fitting within the said recess 276 and resting on the annular ledge 277 formed thereby, is a washer-shaped cam plate 278 provided with three spirally extending similar cam slots 279 uniformly spaced apart around the cam plate. The said cam plate fits in the recess 276 more or less snugly but with just enough clearance to permit free and easy rotation of the cam plate in the said recess. The cam plate 278 has a centrally located circular opening 280 large enough to accommodate the bulb 23 to be held by the chuck.

Secured to the upper surface of the chuck body 269, as by screws 281 (Fig. 23), is a cover plate 282 likewise provided with a centrally located circular opening 283 large enough to accommodate the bulb 23. The cover plate 282 is provided with a removable ring-shaped center insert 284 in its upper face, the said insert having a circular center opening 285 just large enough to accommodate the bulb 23 and preliminarily support the same in a more or less upright position in the chuck 227. The under side of the cover plate 282 is formed with three guideways 286 (Fig. 28) extending radially outward from the central opening 283 in the cover plate and uniformly spaced apart therearound. Slidably mounted within each of the guideways 286 and resting on the upper surface of the cam plate 278 is a chuck finger or jaw element 287. Rigidly fastened to, and depending from the under surface of each of the said jaws 287 is a pin 288. The pins 288 on the three jaws 287 fit into and co-operate with the three spiral cam slots 279 in the cam plate 278 so that when the said cam plate is rotated, the engagement of the pins 288 with the walls of the cam slots causes the jaws to slide in the guideways 286 in the cover plate and to move either radially inward to clamp the bulb 23 in the chuck or radially outward to release the bulb.

Rotation of the cam plate 278 in a counter-clockwise direction (as viewed in plan), to thereby retract or open the chuck jaws 287, is resisted by a coil compression spring 289 disposed in an annular groove 290 in the ledge 277 of the chuck body 269. One end of the spring 289 bears against a stationary post 291 disposed in the said groove and rigidly secured to the chuck body, while the other end of the spring is engaged by a movable post 292 secured to and depending from the under surface of the cam plate 278 and extending into the annular groove 290. The expansive force of the spring 289 tends to rotate the cam plate to its limiting clockwise rotational position and to thus maintain the chuck jaws 287 in a normally closed bulb-clamping position.

Rotation of the cam plate 278 in a counter-clockwise direction to thereby open the chuck jaws 287 is effected by a lever or arm 293 rigidly attached to the cam plate, as by rivets 294, and extending more or less radially out from the cam plate in a direction inwardly of the turret B. The said lever 293 projects through a channel 295 cut in the upper face of the chuck body 269, the arcuate extent of the said channel being sufficient to permit movement of the lever 293 therethrough so as to rotate the cam plate 278 from its normal "closed chuck" position to its actuated "open chuck" position. The free outer end of the cam lever 293 is provided with a roller 296 rotatably mounted thereon for engagement with a cam track 297 (Figs. 1, 19 and 22) suspended from a support arm 298 extending over the top of the turret B and secured at its outer end to the machine housing 10. The cam track 297 extends from a point just preceding the bulb discharging station B19, through the succeeding stations B20 to B24 to a point just beyond the first or bulb receiving station B—1. Thus, the action of the cam track on the cam lever 293 causes each chuck 227 to open, as it is indexed by the turret B, just before it reaches the bulb discharging station B19 and to remain open until just after it leaves the bulb receiving station B—1.

Following the transfer of a bulb 23 from the transfer wheel holder 161 to one of the opened chucks 227 at station B—1, the turret B then indexes the loaded chuck to the next succeeding station B2. During the index movement of the chuck from station B—1 to B2, the cam lever roller 296 rides off the tapered terminal end 299 (Fig. 1) of the cam track 297, thus permitting the chuck jaws 287 to gradually close and grip the bulb 23 in the chuck.

From station B2, which is an idle station, the turret B then successively indexes the loaded chuck 227 through stations B3 and B4, which are likewise idle stations, and thence to station B5 where the bulb 23 is properly positioned, i. e., vertically aligned, and positively seated in the chuck by suitable pneumatic positioning mechanism 300 (Figs. 1 and 29) located adjacent the turret at the said station.

Referring to Fig. 29, the bulb positioning mechanism 300 comprises a vertically extending hollow cylinder 301 disposed above turret B in a position in axial alignment with the chucks 227 positioned at station B5. The cylinder 301 is supported in place by a bracket arm 302 bolted to the front support bracket 180 for the transfer wheel shaft 178. Slidably mounted within the cylinder 301 for reciprocation therein is a composite piston unit 303 comprising outer and inner telescoping plungers 304 and 305, respectively, the inner plunger 305 projecting downwardly beyond the lower end of the outer plunger 304 and being provided at its upper end with an outturned annular flange or collar 306 for engagement with a co-operating annular shoulder 307 within the hollow interior of the outer plunger 304 to thereby limit the expansive movement of the two plunger members with respect to one another. The plungers 304 and 305 are normally held in their limiting expanded position by the action of a compression coil spring 308 thereon, the said spring being disposed within the two plungers and bearing at its lower end against the bottom 309 of a well 310 within the inner plunger 305 and at its upper end against a post 311 threaded into the upper end of the outer plunger 304. At its lower end, the inner plunger 305 is provided with a disc-shaped insert 312 of resilient material, such as rubber, for engagement with the upwardly facing end or rim 24' of the bulb neck 24.

The piston unit 303 is normally held in a raised or retracted position within the cylinder 301 by a compression coil spring 313 disposed within the cylinder and fitting over the outer plunger 304. The said spring bears at its lower end against an annular ledge 314 in the inner wall of the hollow cylinder 301. The upper end of the spring 313 bears against an annular shoulder 315 on the outer wall of the outer plunger 304, and the action of the spring on the said plunger tends to force the plunger upwardly into abutting engagement with a closure cap 316 bolted to, and closing off the top of the cylinder 301.

Compressed air is supplied to the hollow interior 317 of the cylinder 301, at a point above the piston unit 303, through a pipe 318 threaded into an opening 316' in the closure cap 316 and connected, through a valve 319 and pipe 319' (Fig. 15), to a source of compressed air. The said valve 319 is mounted on the front wall of the machine housing 10 adjacent the cross shaft 164, and is similar to the other two valves 159, 160 mounted thereadjacent, it being operated by a cam 320 mounted on the forward end of the said shaft 164.

The working surface 321 of the cam is so shaped as to open the valve 319 for a short instant during each period when the turret B is stationary; i. e., during the interval when successive chucks 227 are stationed at the bulb seating station B5. The opening of the valve 319 thus supplies compressed air to the cylinder 301 with the result that the piston unit 303 is forced downwardly in the cylinder until the rubber insert 312 at the lower end of the inner plunger 305 strikes against the end 24' of the bulb neck 24 and presses the bulb 23 down into positive seating engagement with the bulb seat 273 in the chuck 227. The engagement of the inner plunger 305 with the end of the bulb neck 24 also serves to "right" or vertically align the bulb 23 in the chuck 227. The impact of the inner plunger 305 against the end of the bulb neck is cushioned by the coil spring 308, the inner plunger 305 telescoping into the outer plunger 304 and compressing the said spring 308 upon continued downward movement of the outer plunger 304 following the engagement of the bulb neck by the inner plunger.

From station B5, the turret B then successively indexes each chuck 227 through stations B6 to B15 where the downwardly facing tip portion of the bulb 23 is heated exteriorly by upwardly directed flames or fires 322 from burners 323 (Fig. 30) positioned underneath the turret B at the said stations. The burners 323 are mounted on the machine housing 10 and are connected by pipe 324 to a supply of gaseous combustion admixture ingredients, such as gas and air. The burner at each station is so mounted on the housing 10 as to be aligned with the turret openings 270 and the chuck bushings 272 when each chuck 227 is positioned at the said station. The gas flames 322 thus project up through the turret openings 270 and heat the exposed under surface or tip portion of the bulb 23 in the chuck. The burners 323 are individually operable so that only the required number need be operated, at the stations immediately preceding the bulb tipping station B16, to provide the necessary heating and softening of the bulb to enable the tipping thereof at the said station B16.

From station B15, the turret then indexes the chuck 227 to the bulb tipping station B16 where a pointed plunger or rod 326, on a bulb tipping mechanism 326 (Figs. 31-33) located at said station, moves down into the bulb 23 through the open neck end thereof and punches an outwardly projecting tip or protuberance 327 in the softened wall of the bulb at the tip portion thereof, as indicated in dotted lines in Fig. 33.

Referring to Figs. 31-33, the bulb tipping mechanism 325 comprises a punch head or assembly 328 disposed above the turret B in such a position as to be in alignment with the chucks 227 when the latter are stationed at the bulb tipping station B16. The punch head or assembly is mounted on a horizontally extending, vertically movable arm 329 and comprises a composite plunger unit 330 slidably mounted in a vertically arranged hollow cylinder 331 secured in an opening 332 in said arm 329, as by a lock screw 333.

The plunger unit 330 comprises a hollow body portion 334 through which the plunger rod 326 extends centrally thereof. The said plunger rod 326 projects downwardly from the lower end 335 of the plunger body 334 and is provided with a pointed lower end 336. At its upper end, the plunger rod 326 is formed with a threaded head portion 337 which screws into the plunger body 334 to thereby secure the plunger rod in place within the plunger body and to also provide means for vertically adjusting the plunger rod with respect to the plunger body. Seated in the lower end 335 of the plunger body 334, as by a press fit, and surrounding the plunger 326, is an insert bushing 338 for engagement with the end or rim 24' of the bulb neck 24. The said bushing is made of an extremely hard and wear-resistant material, such as a tungsten-carbide alloy, so as to prevent the development of any wear or roughness on the under or bulb neck engaging surface 339 of the bushing such as would destroy the accuracy of the tip punched on the bulb. By means of the threaded engagement between the plunger rod 326 and the plunger body 334, the point 336 of the plunger rod can be accurately set at a predetermined distance from the under or bulb engaging surface 339 of the insert bushing 338, depending upon the particular size and shape of the bulbs 23 to be tipped. As a result, the point-shaped protuberance or tip punched in the bulb tip by the plunger 326 will be accurately located, for a given bulb size, at the same predetermined distance from the rim or end 24' of the bulb neck. The plunger unit 330 is supported in place within the cylinder 331 by a retaining nut 340 which is threaded onto the projecting upper end of the plunger body 334 and rests against the upper end 341 of the cylinder. Upward sliding movement of the plunger unit 330 within the cylinder 331 is resisted by a compression coil spring 342 disposed within the cylinder over the plunger unit therein, the said spring bearing at its upper end against an annular shoulder 343 within said cylinder and at its lower end against a similar annular shoulder 344 on the plunger body 334.

The support arm 329 on which the punch assembly 328 is mounted, extends radially out beyond the periphery of the turret B where it is secured to a vertically movable saddle or slide member 345, as by a bolt 346 screwed into the said slide member. The said slide member 345, together with the support arm 329 and punch assembly 328, thus form, in effect, a unitary slide assembly. The slide member 345 is slidably mounted on a pair of vertically extending guide posts or rods 347, the slide member being provided, for such purpose, with a pair of vertically spaced ears or slide bearings 348, 349, projecting laterally from each side of the slide member and having openings 350 through which the guide posts 347 extend. The said guide posts 347 are disposed within, and are secured to a yoke-shaped frame or bracket 351 which is located outwardly adjacent the periphery of the turret B and is adjustably fastened, as by bolts 352 and 353 to the top wall of the machine housing 10.

For effecting reciprocation of the slide member 345 on the guide posts 347, the slide member is provided with an operating push rod 354 fastened at its upper end to the slide member and extending down through an opening 355 in the machine housing 10 into the hollow interior thereof. The said push rod 354 is supported in a guide bushing 356 mounted in the opening 355 in the machine housing, and is provided, at its lower end, with a roller 357 for engagement with the working surface 358 of a plate cam 359 (Figs. 4, 31–32) mounted on the cross shaft 164. Upward movement of the push rod 354 and the associated slide member 345 by the cam 359 is resisted by a pair of compression coil springs 360, 360 disposed one over each of the guide posts 347 and bearing at their upper ends against annular shoulders 361 on said posts 347 and at their lower ends against the lower slide bearings 349 on the slide member 345.

The working surface 358 of the cam 359 is so shaped, and the action of the said cam so timed with the index movement of the turret B, as to maintain the slide assembly, comprising the slide 345 and the associated punch assembly 328, in a raised position with the coil springs 360 compressed during the indexing movement of the said turret, and to thereafter permit the compressed coil springs 360 to rapidly move the slide 345 and associated punch assembly 328 downwardly, so as to effect the punching of the tip 327 on the bulb by the pointed plunger 326, when the chuck 227 carrying the bulb is positioned at the tipping station B16.

In addition to the tipping or denting of the bulb 23 at station B16, the bulb is further heated from underneath by a flame 322 from a burner 323 located at said station, the said burner being similar to the other burners 323 located at the preceding stations B6 to B15. The heating of the bulb at the tipping station B16 maintains the glass in a softened or plastic state so that it can be easily deformed by the pointed plunger 326 without liability of the glass cracking. The continued heating of the bulb at station B16, following the tipping operation, also serves to anneal the deformed glass so as to remove any internal strains which may be produced in the glass by the denting thereof.

Following the tipping and annealing of the bulb 23 at station B16, the turret B indexes the chuck 227 carrying said bulb first to station B17, where the tip 227 of the bulb is further heated and annealed by a flame 322 from another burner 323 located at the said station, and thence to station B18 which is merely an idle station.

From station B18, the turret B indexes the chuck 227 to the bulb discharging station B19 where the bulb 23 is ejected from the chuck into a pneumatic conveyor tube or chute 362 (Figs. 34–35) by suitable mechanical ejection mechanism 363 located adjacent the said station. Referring to Fig. 34, the ejection mechanism 363 comprises a vertically rockable lever 364 pivotally mounted intermediate its ends on a pivot pin 364' secured to an upstanding support bracket 365 fixedly attached to the machine housing 10. The lever 364 is rocked by the slide 345 of the bulb tipping mechanism 325, one end of the lever being connected to the slide by a spring cushioned link 366 comprising a vertically extending post 367 secured at its lower end to one of the lower slide bearings 349 of the slide 345. The said lever end is bifurcated into two disc-shaped extensions or arms 368 which straddle the post 367 and are pressed downwardly into engagement with a shoulder 369 on said post by a compression coil spring 370 fitting over the post. The said spring 370 bears at its upper end against a stationary spring follower 371 secured to the post 367, and its lower end against a movable spring follower 372 slidably mounted on said post and engaging the two disc-shaped lever extensions 368. As the slide 345 reciprocates on its guide posts 347, the bifurcated end of the rocker lever 364 is likewise moved up and down, thus causing the said lever to rock on the pivot pin 364'.

The end 373 of the lever 364 opposite the bifurcated end thereof, extends into a vertically arranged sleeve or cylinder 374 through a longitudinal slot 375 in the wall thereof. The cylinder 374 is mounted on the machine housing 10 in a position directly underneath and in alignment with the chucks 227 when the latter are positioned at the bulb discharging station B19. Slidably mounted in the cylinder 374 is a piston 376 provided with a lateral opening or slot 377 extending therethrough and formed with a rounded restriction 378 therein. The lever end 373 projects into the piston slot 377 through the restriction 378 therein, the said restriction being just large enough to receive the lever end 373 and permit rocking movement of the latter therein. Secured to and projecting vertically up from the upper end of the piston 376 is a push rod 379 of such size as to freely pass through the restricted opening 380 in the bulb seating member 272 of the chuck 227.

During the index movement of each chuck 227 from station B18 to the bulb unloading station B19, the chuck is opened by the engagement of the chuck cam lever 293 with the cam track 297, the said lever rotating the cam plate 278 so as to retract the chuck jaws 287 sufficiently to permit upward removal of the bulb 23 from the chuck. Then, during the interval when each chuck is positioned at the bulb unloading station B19, the downward movement of the slide 345, occasioned by the operation of the bulb tipping mechanism 325, causes the lever 364 to pivot and raise the piston 376 until the push rod 379 strikes the bulb 23 and ejects the same upwardly from the chuck into the discharge chute 362 overlying the chuck at the said station B19. The said discharge tube or chute 362 is suitably supported on the machine housing 10 and is provided with an opening 381 in the underside thereof in line with the chuck 227, through which opening the bulb is projected into the chute. Immediately upon entering the chute 362 the bulb 23 is carried therethrough by a stream of compressed air emanating from a nozzle 382 disposed within the chute immediately adjacent the opening 381 therein. The said nozzle 382 is provided with a pair of air jet openings 383 and is connected by a pipe 384 to a suitable source of compressed air, and the stream of air in the chute 362 conveys the bulb 23 therethrough to suitable bulb receiving means (not shown) located at the discharge end of the chute.

After the removal of the bulb 23 from the chuck 227 at station B19, the chuck is then successively indexed to stations B20 and B21 where jets 385 of compressed air, from nozzles 386 disposed directly underneath the chucks at said stations, are directed upwardly through the chucks to thereby clean out the chucks by expelling therefrom any bulb which may chance to remain therein, or any broken fragments of glass which may be present in the chucks. From station B21, the chucks are then indexed through idle stations B22, B23 and B24 and thence to the bulb receiving station B-1 once more.

To prevent entry of foreign matter into the chamber 252 in turret "B" through the space between the upturned flange 256 (Fig. 22) and the hub 248 of the said turret, an inverted dish-shaped cover or hood 387 overlying the said space is provided, the cover 387 being secured to the inner end of the cam track support arm 298 (Fig. 1). The said inner end of the support arm 298 is fastened to a center post 388 extending upwardly from the upper end of the turret support shaft 236 and journaled in a roller bearing 389 mounted in the said shaft 236.

The operation of the machine comprising our invention may be briefly summarized as follows:

First, a bulb 23 is fed from the feed chute 73 to that bulb holder 20 on the turret A which is positioned at station A-1 opposite the discharge end of the feed chute, the feeding of the bulb being effected by the release mechanism 76 mounted on the chute 73. From station A-1, the bulb 23 is then successively indexed through idle stations A2 to A5 and thence to station A6 where it is centered in the rotating bulb holder 20 by means of the aligning bar 107 which engages the bulb to center the same. The bulb 23 is then indexed to station A7 where the rotating bulb neck 24 is circumferentially heated, at the point where it is to be severed, by the concentrated pin point fires 109 from the burner 110 located at said station. At the next station A8, the closed end of the bulb neck 24 is severed from the bulb by the engagement of the chilled metal crack-off wheel 113 of the crack-off mechanism 112 with the heated glass of the bulb neck. The bulb 23 is then successively indexed to stations A9 and A10 where the cut edge of the bulb neck is glazed by the gas flames 151 from the burners 152 and 153 at said stations. From station A10 the bulb 23 is indexed through idle station A-11, then to station A12 where it is again centered in the bulb holder 20 by the aligning bar 158, and finally to the discharge station A13 where it is transferred to one of the holders 161 on the transfer wheel T by the interruption of the vacuum in the holder 20 and the passage of an air blast therethrough to eject the bulb therefrom and into the holder 161.

The transfer wheel T transfers the bulb 23 to one of the chucks 227 on turret B, which then indexes the bulb successively through idle stations B2 to B4 and thence to station B5 where the bulb is positively seated and vertically righted in the chuck by the downward movement of the piston unit 303 of the bulb positioning mechanism 300 into engagement with the upwardly facing end 24' of the bulb neck 24. From station B5, the bulb 23 is then successively indexed through stations B6 to B15 where the downwardly facing tip portion of the bulb is exteriorly heated, at one or more of said stations by the upwardly directed gas flames 322 from the burners 323 disposed underneath the chucks at the said stations. Following the heating of the bulb at stations B6 to B15, the bulb is then indexed to station B16 where the pointed plunger rod 326 of the tipping mechanism 325 at said station moves down into the bulb and punches the outwardly projecting tip or protuberance 327 on the bulb at the tip portion thereof. In addition to the punching of the tip 327 on the bulb at the said station B16, the tip portion of the bulb is further heated and annealed by a gas flame 322 from the burner 323 located at said station. At the next station B17, the tip portion of the bulb is further heated by a gas flame 322 from the burner 323 at said station to thereby remove the internal strains in, and anneal, the glass at the tip portion of the bulb. From station B17, the bulb 23 is then indexed to the idle station B18 and finally to the bulb discharge station B19 where the bulb is ejected from the chuck 227 into the discharge or conveyor chute 362 by the ejection mechanism 363 located at said station. The stream of air in the conveyor chute 362 then carries the bulb through the chute to suitable bulb receiving means located adjacent the discharge end of the chute.

What we claim as new and desire to secure by Letters Patent of the United States is:

1. In combination, a pair of horizontal turrets disposed side-by-side at different levels and each mounted to rotate about a vertical axis, article holders carried by each of said turrets, and a vertical transfer wheel mounted to rotate about a horizontal axis and disposed between said pair of turrets, suction type sockets carried by said transfer wheel and adapted to hold the articles, means for rotating said turrets and transfer wheel in timed relation to carry a socket on the transfer wheel from an article receiving position opposite a holder on the higher one of said turrets to an article discharging position directly over a holder on the lower one of said turrets, means for effecting transfer of the article from a holder on the higher turret into a socket on the transfer wheel, and rotary valve means associated with said transfer wheel for continuously connecting the socket to a source of vacuum from the time the socket is first positioned at the said article receiving position until just prior to its location at the article discharging position and for connecting said socket to a source of compressed air when located at the said article discharging position to thereby produce an air blast through the socket serving to eject the article therefrom and into the article holder positioned therebelow.

2. In apparatus of the class described, the combination of a first rotatable turret having suction type holders thereon carried through a plurality of stations including a loading station and a discharging station, a second rotatable turret adjacent said first turret and having suction type sockets thereon carried through a plurality of stations, means for rotating said turrets in timed relation to carry a holder on the first turret and a socket on the second turret to positions opposite one another, means including a rotary valve associated with said first turret for connecting each article holder thereon to a source of vacuum from the time it first reaches the loading station until it is positioned at the unloading station and then connecting said article holder to a supply of compressed air to thereby eject the article therein from said holder, and means comprising a rotary valve associated with said second carrier for connecting each of the sockets thereon to a source of vacuum while it is positioned opposite the holder on the first turret to create a suction in said socket serving to draw the ejected article into the socket and hold it therein.

3. The method of transferring a lamp bulb from one holder to another holder having a hollow interior which comprises, mounting the bulb in the said one holder with the neck of the bulb projecting outwardly therebeyond, disposing said holders in opposed and sufficiently close relation to at least partially introduce the projecting bulb neck into the hollow interior of the other of said holders, creating a vacuum in said other holder tending to draw the bulb thereinto, and then releasing the bulb in said one holder and directing a blast of air thereagainst to eject it from the said one holder and into the other holder.

4. In combination, a first carrier member having a head for holding a lamp bulb with the neck end thereof projecting outwardly beyond said head, a second carrier member disposed adjacent the path of travel of said head and provided with a hollow bulb holder having a notch in its rim for the passage of the bulb neck therethrough, means for advancing said carrier members in timed relation to carry the head and the holder to positions opposite one another and to move the neck of the bulb in said head through the said notch and introduce it into the hollow interior of said holder, and means for connecting the head to a source of compressed air when positioned opposite the holder to produce an air blast through the head serving to eject the bulb from said head and transfer it into the said holder.

5. In combination, a first carrier member having a head for holding a lamp bulb with the neck end thereof projecting outwardly beyond said head, a second carrier member disposed adjacent the path of travel of said head and provided with a hollow bulb holder having a notch in its rim for the passage of the bulb neck therethrough, means for advancing said carrier members in timed relation to carry the head and the holder to positions opposite one another and to move the neck of the bulb in said head through the said notch and introduce it into the hollow interior of said holder, means for connecting the head to a source of compressed air when positioned opposite the holder to produce an air blast through the head serving to eject the bulb from said head and into the said holder, and means for connecting the holder to a source of vacuum while it is positioned opposite the head to produce a suction in said holder serving to draw the ejected bulb into the holder and retain it therein.

6. A transfer device comprising a rotatable turret having thereon hollow suction sockets projecting radially from the periphery of the turret, each of said sockets having a notch in one side thereof for passage of a portion of an article laterally therethrough, and a suction conduit communicating with the inner end of each socket.

7. In apparatus of the class described for reshaping glass lamp bulbs, the combination of two horizontal turrets disposed side-by-side at different levels and each mounted to rotate about a vertical axis, the higher turret having radially extending suction type holders for holding the bulbs by their tip ends with their necks projecting outward therefrom, the lower turret having upwardly extending holders for holding the bulbs with their necks uppermost, and a vertical transfer wheel mounted to rotate about a horizontal axis and disposed between said horizontal turrets, suction type sockets extending radially outward from the periphery of said transfer wheel and carried thereby from a position in horizontal alignment with a holder on the higher turret to a position above and in vertical alignment with a holder on the lower turret, means for indexing the two turrets and the transfer wheel in proper time relation, means for connecting a holder on the higher turret to a source of compressed air when it is in alignment with a socket on the transfer wheel to transfer the bulb from the said holder to the said socket, and means for connecting a socket on the transfer wheel to a source of compressed air when it is in alignment with a holder on the lower turret to transfer a bulb from said socket to said holder.

8. Apparatus of the class described comprising, in combination, two horizontal turrets mounted side-by-side at different levels to rotate about vertical axes, the higher turret having a plurality of radially extending suction type holders around its periphery each adapted to hold a glass bulb with a neck portion of the bulb projecting from the holder, the lower turret having a plurality of upwardly facing holders around its periphery adapted to receive the bulbs from the higher turret, and a vertical transfer wheel mounted between said horizontal turrets to rotate about a horizontal axis and having a plurality of radially extending suction type sockets at its periphery, said transfer wheel being arranged to carry its sockets successively from a bulb receiving position in horizontal alignment with a holder on the higher turret to a bulb discharging position in vertical alignment with a holder on the lower turret, means for applying suction to the holders on said higher turret and to the sockets on said transfer wheel during rotation thereof to hold the bulbs therein, means for discontinuing the suction and substituting an air blast through each holder on the higher turret when it is opposite a socket on the transfer wheel to deliver a bulb, neck foremost, from said holder to said socket, and means for similarly discontinuing the suction and substituting an air blast through each socket on the transfer wheel when it is opposite a holder on the lower turret to deliver a bulb from said socket to said holder.

ADRIEN F. CASLER.
JOHN J. SALO.

REFERENCES CITED

The following references are of record in the file of this patent:

UNITED STATES PATENTS

| Number | Name | Date |
|---|---|---|
| 568,142 | Lean et al. | Sept. 22, 1896 |
| 1,011,523 | Swan | Dec. 12, 1911 |
| 1,132,277 | Marshall | Mar. 16, 1915 |
| 1,251,541 | Knight | Jan. 1, 1918 |
| 1,508,358 | Brown | Sept. 9, 1924 |
| 1,655,141 | Fagan et al. | Jan. 3, 1928 |
| 1,756,843 | Wheeler | Apr. 29, 1930 |
| 1,864,023 | Ledig | June 21, 1932 |
| 1,869,533 | Wetmore | Aug. 2, 1932 |
| 1,984,031 | Purdy et al. | Dec. 11, 1934 |
| 2,004,492 | McNamara et al. | June 11, 1935 |
| 2,098,030 | Donovan et al. | Nov. 2, 1937 |
| 2,134,955 | Risser | Nov. 1, 1938 |
| 2,146,572 | Hahn et al. | Feb. 7, 1939 |
| 1,164,285 | Schutz | June 27, 1939 |
| 2,168,419 | Paterson | Aug. 8, 1939 |
| 2,206,267 | Schutz et al. | July 2, 1940 |
| 2,207,179 | Schreber | July 9, 1940 |